(12) United States Patent
Olson et al.

(10) Patent No.: US 6,206,394 B1
(45) Date of Patent: *Mar. 27, 2001

(54) HEALTH EXERCISE EQUIPMENT PROPELLED BY SIMULATED ROWING MOTION

(75) Inventors: Scott B. Olson, Waconia; David P. Sauter, Carver, both of MN (US)

(73) Assignee: O.S. Designs, Inc., Waconia, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/259,850

(22) Filed: Mar. 1, 1999

Related U.S. Application Data

(63) Continuation-in-part of application No. 08/585,559, filed on Jan. 12, 1996, now Pat. No. 5,876,052.

(51) Int. Cl.$^7$ ..................................................... B62M 1/16
(52) U.S. Cl. ........................ 280/244; 280/220; 280/240; 280/304
(58) Field of Search ..................................... 280/220, 234, 280/238, 221, 226.1, 252, 253, 244, 243, 270, 249, 304; 482/61, 57

(56) References Cited

U.S. PATENT DOCUMENTS

| 273,007 | 2/1883 | Baker . |
|---|---|---|
| 348,619 | 9/1886 | Courtney . |
| 422,087 | 2/1890 | Loser . |
| 516,786 | 3/1894 | Clark . |
| 588,698 | 8/1897 | Eickershoff . |
| 606,854 | 7/1898 | Bergstrom . |
| 641,426 | 1/1900 | Allen . |
| 642,544 | 1/1900 | Burbank . |
| 697,104 | 4/1902 | Pietsch . |
| 749,153 | 1/1904 | Batchelor . |
| 846,033 | 3/1907 | Kidney . |

(List continued on next page.)

*Primary Examiner*—Anne Marie Boehler
(74) *Attorney, Agent, or Firm*—Nikolai, Mesereau & Dietz, P.A.

(57) ABSTRACT

An exercise apparatus to exercise the upper and lower body that is powered by a simulated rowing motion is described. The exercise apparatus includes a frame, front and rear wheels, a slide rail, a lever arm, a steering mechanism and a drive mechanism that translates the user's energy to propel the exercise apparatus. The rotation point of the lever arm, the fulcrum of the lever arm, the maximum distance the lever arm travels fore and aft, and the length of the lower portion of the lever arm, among others is adjustable to maximize efficiency or effectiveness of exercising the user's upper and lower body. Stabilizing members are attachable to the rear wheel axle, wherein the stabilizing members are adjustable to either elevate the rear wheel above the riding surface or provide stabilization to the extent required by the user.

41 Claims, 22 Drawing Sheets

U.S. PATENT DOCUMENTS

| | | | |
|---|---|---|---|
| 1,020,432 | 3/1912 | McBarnes . | |
| 1,359,957 | 11/1920 | Bolen et al. . | |
| 1,500,809 | 7/1924 | Giufri . | |
| 1,792,045 | 2/1931 | Siefken . | |
| 1,845,044 | 2/1932 | Curry | 280/440 |
| 2,049,345 | 7/1936 | Young | 208/38 |
| 3,006,427 | 10/1961 | Van Der Lely | 180/27 |
| 3,039,790 | 6/1962 | Trott | 280/251 |
| 3,429,584 | 2/1969 | Hendricks | 280/261 |
| 3,664,684 | 5/1972 | Long | 280/231 |
| 3,760,905 | 9/1973 | Dower | 185/2 |
| 3,884,501 | 5/1975 | Elias et al. | 280/251 |
| 3,889,974 | 6/1975 | Kallander | 280/251 |
| 3,913,929 | 10/1975 | Matsura | 280/7.14 |
| 3,913,945 | 10/1975 | Clark | 280/233 |
| 4,179,135 | 12/1979 | Slater | 280/276 |
| 4,305,600 | 12/1981 | Mendez | 280/226 R |
| 4,326,729 * | 4/1982 | Luckowski et al. | 280/304 |
| 4,373,740 | 2/1983 | Hendrix | 280/269 |
| 4,432,561 | 2/1984 | Feikema et al. | 280/281 |
| 4,451,064 | 5/1984 | Perkins | 280/259 |
| 4,456,277 | 6/1984 | Carpenter | 280/282 |
| 4,469,343 | 9/1984 | Weatherford | 280/261 |
| 4,497,502 | 2/1985 | Forbes et al. | 280/281 LP |
| 4,508,358 | 4/1985 | Erel | 280/234 |
| 4,526,392 | 7/1985 | Berkstresser | 280/281 LP |
| 4,527,811 | 7/1985 | DeMoss | 280/281 LP |
| 4,541,647 | 9/1985 | Braun | 280/234 |
| 4,548,421 | 10/1985 | Wiener | 280/281 LP |
| 4,572,535 | 2/1986 | Stewart et al. | 280/282 |
| 4,618,160 | 10/1986 | McElfresh | 280/281 LP |
| 4,632,414 | 12/1986 | Ellefson | 280/246 |
| 4,639,007 | 1/1987 | Lawrence | 280/234 |
| 4,700,962 * | 10/1987 | Salmon | 280/220 |
| 4,705,284 | 11/1987 | Stout | 280/242 WC |
| 4,773,663 | 9/1988 | Sawyer et al. | 280/261 |
| 4,786,070 | 11/1988 | Adee | 280/281 LP |
| 4,789,173 | 12/1988 | Lofgren et al. | 280/281 LP |
| 4,796,907 | 1/1989 | Geller | 280/220 |
| 4,807,896 | 2/1989 | Philippi | 280/243 |
| 4,826,190 | 5/1989 | Hartmann | 280/236 |
| 4,838,568 | 6/1989 | Arroyo | 280/234 |
| 4,846,488 | 7/1989 | Szadkowski | 280/221 |
| 4,878,684 | 11/1989 | Lemle | 280/288.1 |
| 4,886,287 | 12/1989 | Krause et al. | 280/246 |
| 4,925,200 | 5/1990 | Jones | 280/233 |
| 4,928,986 | 5/1990 | Carpenter | 280/234 |
| 4,941,673 | 7/1990 | Bennett | 280/112.2 |
| 4,976,451 | 12/1990 | Kamenov | 280/226.1 |
| 4,993,733 | 2/1991 | Eilers | 280/261 |
| 5,069,469 | 12/1991 | Rosengrant et al. | 280/288.1 |
| 5,280,936 | 1/1994 | Schmidlin | 280/234 |
| 5,330,218 | 7/1994 | Escudero | 280/245 |
| 5,468,201 | 11/1995 | Minoura | 482/61 |
| 5,876,052 * | 3/1999 | Olson et al. | 280/244 |

\* cited by examiner

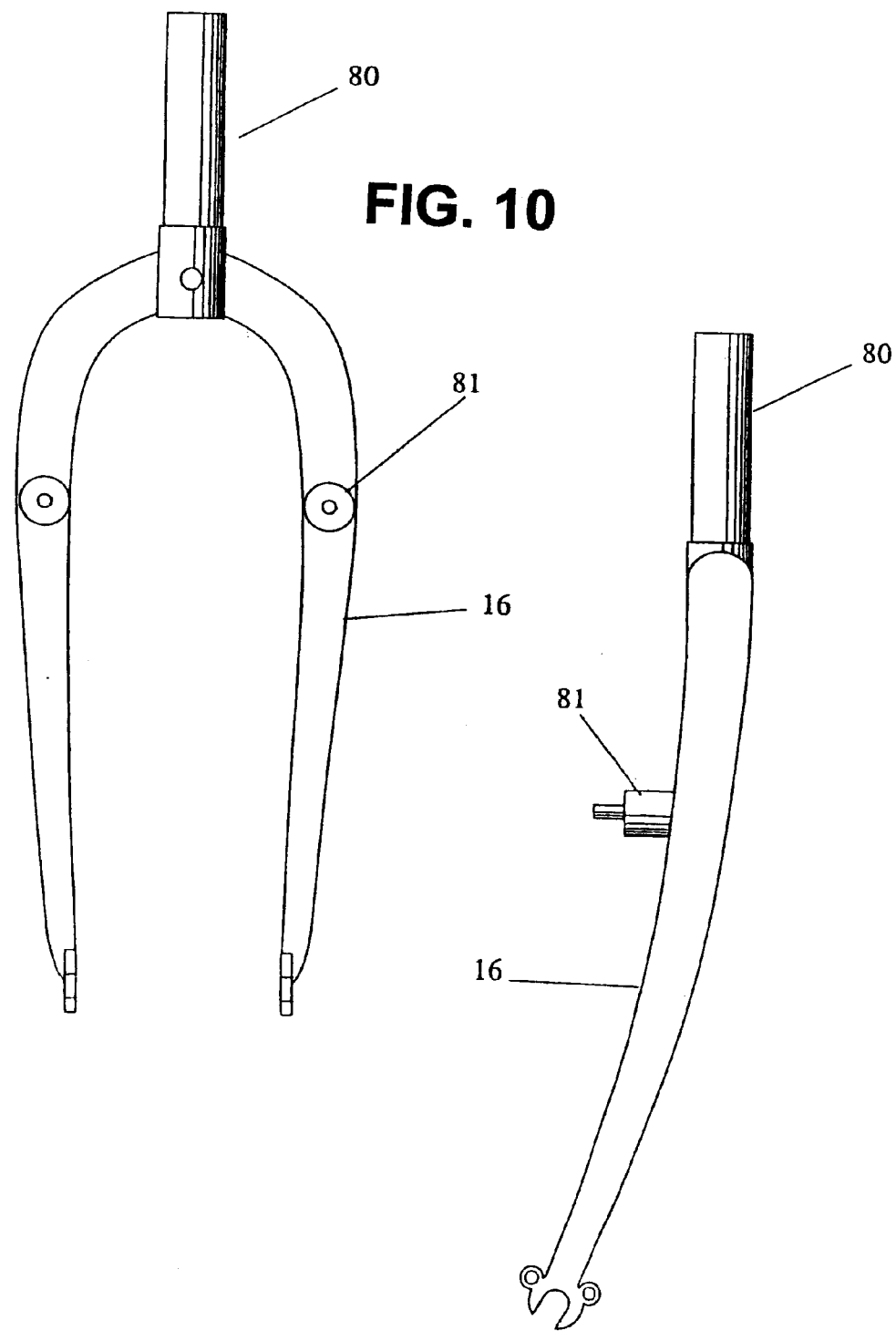

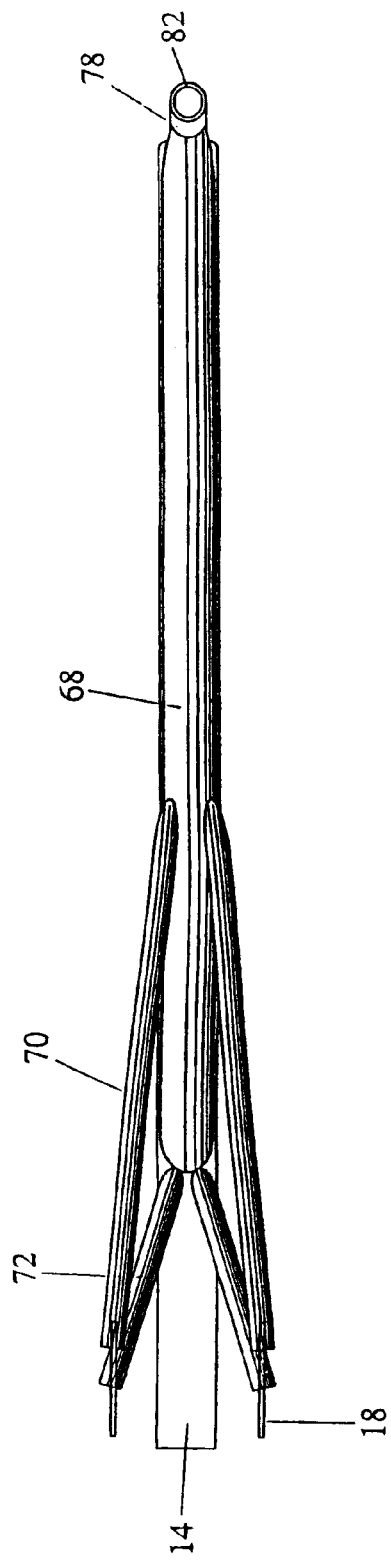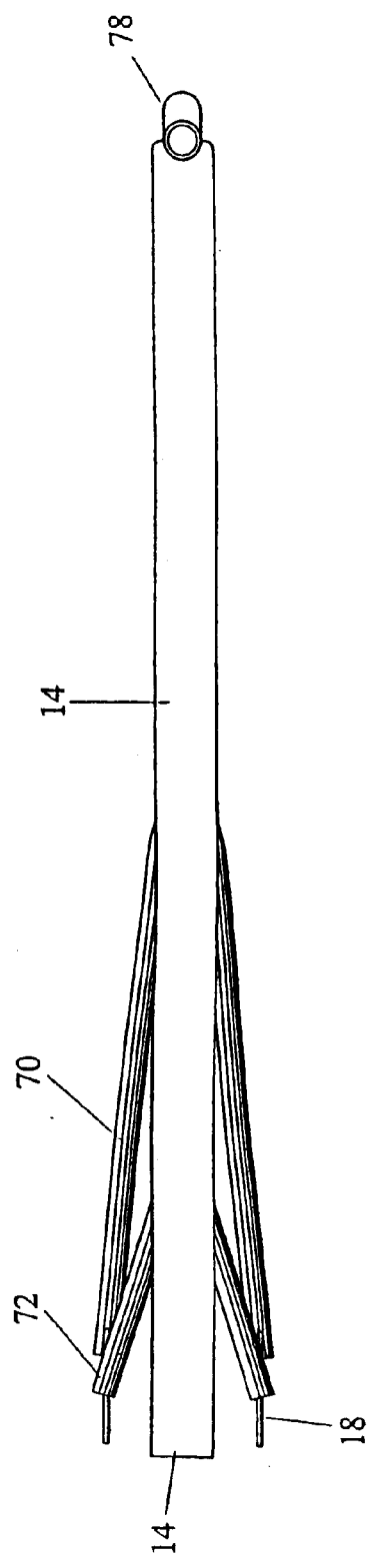

HEALTH EXERCISE EQUIPMENT PROPELLED BY SIMULATED ROWING MOTION

CROSS REFERENCE TO EARLIER APPLICATION

This application is a Continuation-in-Part application of U.S. application Ser. No. 08/585,559, filed Jan. 12, 1996, now U.S. Pat. No. 5,876,052 entitled "HEALTH EXERCISE EQUIPMENT PROPELLED BY SIMULATED ROWING MOTION".

BACKGROUND OF THE INVENTION

I. Field of the Invention

This invention relates generally to exercise equipment, and more particularly to relates to versatile health exercise equipment that may be utilized as either a stationary exercising device or as a transport vehicle that exercises both the upper and lower body. The exercise apparatus of the present invention is propelled by a simulated rowing motion, wherein the length of the rowing stroke and amount of force required for rowing is adjustable to thereby maximize the efficiency and/or effectiveness of exercising the user's upper and lower body. The exercise apparatus of the present invention further includes an improved stabilizing member and drive mechanism. The exercise apparatus of the present invention simulates the rowing motion of a scull, utilizing and exercising the major muscle groups of both the upper and lower body.

II. Discussion of the Related Art

For many years the bicycle has been used as an economic mode of transportation. The typical bicycle is foot powered, wherein foot pedals are connected to crank shafts which in turn rotate a sprocket that is chain linked to the rear wheel. The use of such a bicycle is an excellent workout for the lower body, however, the upper body muscles are not equally exercised. The only significant exercise to the upper body muscles occurs when the user steers the bicycle using the upper body muscles for steering.

Various rowing type vehicles have been devised, whereby a rowing motion powers the vehicle. The following patents describe vehicles powered by a simulated rowing motion: Lawrence, U.S. Pat. No. 4,639,007 (hereinafter the '007 patent); McElfresh, U.S. Pat. No. 4,618,160 (hereinafter the '160 patent); Salmon, U.S. Pat. No. 4,700,962 (hereinafter the '962 patent); Mendez, U.S. Pat. No. 4,305,600 (hereinafter the '600 patent); Ellefson, U.S. Pat. No. 4,632,414 (hereinafter the '414 patent); Geller, U.S. Pat. No. 4,796,907 (hereinafter the '907 patent); International PCT application WO 94/18059 (hereinafter the WO patent); and Horst, European Patent No. 461,286 A1 (hereinafter the '286 patent). None of these patents show or describe a slide rail and support member in vertical alignment, a lever arm used to row the vehicle containing a portion of the drive mechanism within the lever arm, and/or the lever arm rotatably attached to the vehicle below the slide rail. Each of the drive mechanisms disclosed by the prior art is exposed to the user. The user's clothing or accessories can easily catch in the drive mechanism, potentially creating a hazardous situation to the user. Hence, there is a need for a rowing type vehicle that reduces the amount of drive mechanism exposed to the user.

Lawrence, in the '007 patent, discloses a low clearance exercise cart having four wheels. The user sits on a seat of the cart and pushes against foot pedals. The foot pedals slide on a rail and are attached to a drive mechanism. The drive mechanism includes a cable attached at one end to the foot pedals and the other end is attached to a wind-up pulley and rear axle. As the foot pedals are pushed forward, the cable rotates the pulley and rear axle, thereby moving the cart forward. A spring connected to the foot pedals tends to return the foot pedals to their rearward position. At this point, a wind up spring causes the cable to rewind on the pulley. A second cable is attached at one end to a second wind-up pulley and rear axle and at the other end to a hand bar. When the hand bar is pushed forward, the rear axle rotates, thereby moving the cart forward.

The cart disclosed by Lawrence is limited in several respects. First, the drive mechanism is not variable. When traveling up a steep hill, it may become impossible for the user to supply enough force against the foot pedals to move them forward. Second, the handle bar powers the rear axle when the bar is pushed forward. Generally, a user can supply a greater force by pulling compared to pushing. When traveling up a steep hill, it may likewise be impossible for the user to supply enough force against the handle bar to push it forward. Third, the cart disclosed requires a wide riding path. Hence, there is a need for a narrow vehicle that is easily operable in varying terrain.

The carts disclosed in the '907 and '414 patents are likewise limited by the width of the front axle. A front axle having a wheel connected on each end is provided to increase the stability of the cart. Also, a chain or cable forming part of the drive mechanism is attached to a lever arm between the handle bar and fulcrum of the lever arm, requiring additional pulleys. Neither the '907 or '414 patent disclose positioning the fulcrum between the handle bar and the chain.

Salmon in the '962 patent discloses a three wheeled rowing type vehicle. Cables link a rotation axis of the seat to the front fork. By leaning to one side or the other, the front fork is rotated, thereby steering the vehicle. There are situations, for example riding over bumps, where the user unintentionally leans to one side without wanting to alter the course of propulsion. In this instance, the imbalance of the vehicle is compounded, making the vehicle difficult to steer. The present invention overcomes these and other disadvantages of the prior art.

SUMMARY OF THE INVENTION

The present invention overcomes these and other disadvantages by providing an exercise apparatus that is powered by a simulated rowing motion, wherein the length of the rowing stroke and amount of force required for rowing is adjustable to thereby maximize the efficiency and/or effectiveness of exercising the user's upper and lower body. The exercise apparatus includes a handle bar and lever arm pivotally mounted to a unshaped frame and connected to a drive mechanism. A seat slides on a slide rail, allowing the user to push and pull against a lever arm and footrest connected to the frame. The user propels the exercise apparatus by pushing and pulling the lever arm in a rowing motion using upper body muscles, while sliding in unison on the slide rail, using lower body muscles. A steering device is connected to the handle bar and front fork of the exercise apparatus, allowing the user to steer the exercise apparatus during the rowing motion.

Without limitation, components of the frame and lever arm are manufactured from a hollow tubular alloy and are extruded to form the desired shape. The main frame or support member is attached to a lower portion of the slide rail and extends downward from the slide rail such that the slide rail and support member or frame lie in a central vertical plane of the apparatus. The seat is slidably mounted on the slide rail, whereby a user may sit on the seat and slide between a first forward position and a second rearward position. The front fork is attached to a front portion of the frame or slide rail and a rear fork is attachable to a rear portion of the frame or slide rail. The front and rear wheels are rotatably mounted to the front and rear fork, respectively.

The frame, front and rear forks, and slide rail are dimensioned such that when the wheels are attached, the slide rail angles slightly forward relative to the riding surface plane. The slight angle creates added resistance when the user is sliding rearward, thereby requiring the user to exert an additional force with the leg muscles.

The lever arm is rotatably attached about its fulcrum to a portion of the frame or support member. The lever arm's fulcrum is adjustable and the point of attachment on the support member is adjustable, allowing the user to change the amount of torque provided by the lever arm and the arc the lever arm passes through as the lever arm is rotated between the fore and aft positions. As the lever arm pivots about its fulcrum, the frame traverses through a window formed in the lever arm. In this manner, the stability and durability of the exercise apparatus are enhanced.

The steering handle bar is preferably pivotally attached to an upper end of the lever arm. A chain member is attached to the lower end of the lever arm. The distance from the fulcrum to the point of attachment of the chain to the lever arm determines the amount of torque translated to the driving mechanism. The shorter the distance between the fulcrum and the chain connection point, the greater the translated torque. The chain member extends from the lever arm to a top portion of a sprocket attached to a hub of the rear wheel and wraps around the sprocket returning to the lever arm. A resilient member, such as a bungee cord, is attached to the other end of the chain and extends up into a hollow center portion of the lever arm.

The resilient member wraps around a pulley or wheel pivotally connected to the lower end of the lever arm and extends up into the lever arm. A second pulley or wheel is pivotally attached within the lever arm. The resilient member wraps around the second pulley and extends back down towards the lower end of the lever arm. The free end of the resilient member extends out a side of the lever arm and is adjustably secured to the outer surface of the lever arm.

The resilient member provides continuous tension on the chain such that, as the lever arm rotates from a forward to rearward position, no slack in the chain is detected. As the lever arm is pulled rearward overcoming the resistance of the resilient member, the resilient member stretches. When the user stops pulling the lever arm rearward, the resilient member tends to return to its original length, thereby forcing the lever arm towards its forward position.

A steering cable links the steering handle bars to the front wheel. In the preferred embodiment a cam is attached along the same access as the steering column and a second cam is attached to the rotational axis of the front fork. A middle portion of the steering cable wraps around the steering column cam. Each end of the steering cable extends down into the lever arm and out a bore proximate the fulcrum. The ends of the steering cable extend out the lever arm and each end is adjustably attached to opposing sides of the second cam. When the steering handle bar is rotated slightly the cable rotates the second cam in the same direction. In this manner, a simple steering mechanism is provided which is operable throughout the entire stroke of the lever arm.

Pivoting footrests are attached, proximate the forward end, on each side of the frame. These foot rests are used by a rider to push the seat back along the slide rail to the rearward position. The foot rests pivot, adjusting to the varying angle at which the user's leg and foot are extended. The foot rest may further be adjusted vertically along the frame to adjust to varying body sizes of the user.

In another embodiment of the present invention, the exercise apparatus generally includes a frame, front and rear wheels rotatably attached to the frame, steering means for controlling the direction of travel of the apparatus, and an adjustable drive means for translating the user's energy to propel the exercise apparatus. More particularly, the exercise apparatus includes a slide rail forming a top portion of the frame and having a seat in sliding communication with the slide rail, a support member attached to a lower portion of the slide rail and extending downward from the slide rail, wherein the slide rail and the support member lie in a central vertical plane of the apparatus, and a lever arm rotatably connected to the support member and rotatable between a forward and rearward position.

The support member and lever arm are adjustable wherein a distance from the slide rail to a rotation point of the lever arm may be set proportionate to a total distance the lever arm travels past a point on the slide rail as the lever arm is rotated between the forward and rearward position. Although pins and bores are the preferred mode of adjustment, those skilled in the art will appreciate that other adjusting mechanisms of known suitable construction may be implemented into the support member and lever arm. Those skilled in the art will appreciate that the rowing efficiency is enhanced when, as the lever arm is rotated to a forward most position, a horizontal axis of a bottom of the lever arm is below a rotation axis of the rear wheel.

The drive means includes a linkage member having a first end attached to a lower end of the lever arm and extending upwardly and around a hub of the rear wheel to a second end of the linkage member, wherein the second end of the linkage member is attached to a resilient member that is attached to the lever arm. Those skilled in the art will appreciate the many advantages of providing an adjustable lever arm, thereby allowing adjustment of the position that the first end of the linkage member is attached to the lower end of the lever arm. The drive means may further include means for adjusting the amount of torque required to rotate the rear wheel.

In another alternate embodiment of the present invention, the exercise apparatus includes removable stabilizing means attached to the rear wheel. Without limitation, the stabilizing means includes height adjusting members, each height adjustment member having means for setting the height adjustment member to a first height such that the rear wheel is elevated above a riding surface and a second height such that a lower portion of the height adjustment member is elevated above the riding surface. Additionally, the bottom of the height adjustment member may include a wheel rotatably attached to the lower portion of the height adjustment member. In this manner, the wheels may be elevated slightly above the riding surface, but may provide added stability if the apparatus leans to far to one side or the other while in motion or while stationary.

OBJECTS OF THE INVENTION

It is accordingly a principle object of the present invention to provide an exercise apparatus that is powered by both the upper and lower body muscles of the rider.

Another object of the present invention is to provide a simple efficient exercise apparatus powered by simulated rowing motion.

Yet another object of the present invention is to provide an exercise machine powered by a simulated rowing motion having an enhanced steering mechanism, driving mechanism, and lever arm.

Still a further object of the present invention is to provide an exercise machine powered by a simulated rowing motion, wherein the lever arm contains the steering cables and a portion of the drive mechanism within the lever arm.

These and other objects, as well as these and other features and advantages of the present invention will become readily apparent to those skilled in the art from a review of the following detailed description of the preferred embodiment in conjunction with the accompanying claims and drawings in which like numerals in the several views refer to corresponding parts.

DESCRIPTION OF THE DRAWINGS

FIG. 10 is a front elevational view of the front fork of the present invention;

FIG. 11 is a side elevational view of the fork shown in FIG. 10;

FIG. 14 is a bottom plan view of the frame shown in FIG. 12;

FIG. 15 is a top plan view of the frame shown in FIG. 12;

DETAILED DESCRIPTION OF THE PREFERRED EMBODIMENT

Figure 1:
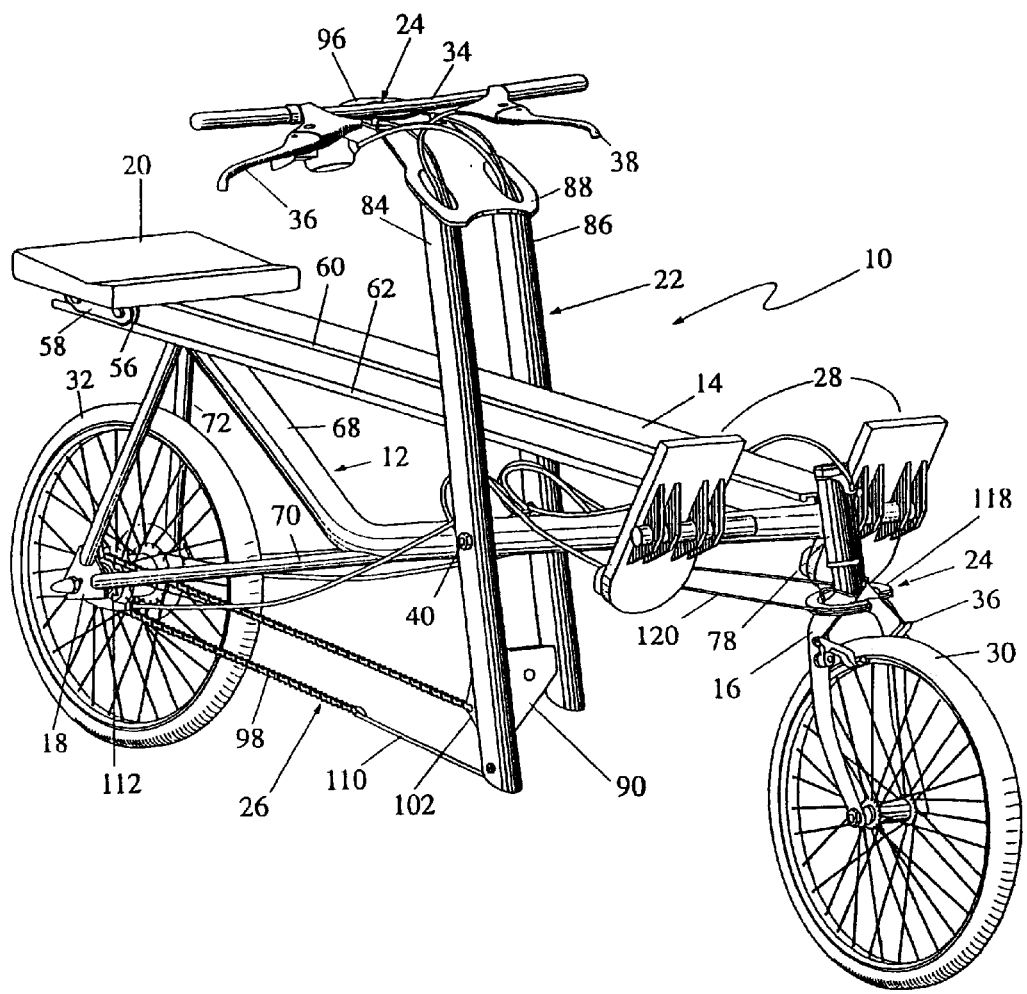
FIG. 1 is a perspective view of the exercise apparatus of the present invention.

Referring first to FIG. 1–5, there is shown generally an exercise machine or apparatus 10, that is propelled by a simulated rowing motion. The rowing exercise machine 10 comprises a frame 12, slide rail 14, front and rear forks 16 and 18 respectively, seat 20, lever arm 22, steering mechanism 24, drive mechanism 26, foot rest 28, front and rear wheels 30 and 32 respectively, steering handle bar 34, and front and rear brakes 36 and 38 respectively. Without any limitation intended, the frame 12, slide rail 14, rear fork 18, and lever arm 22 are all constructed from a high grade, lightweight aluminum alloy. Those skilled in the art will appreciate that components of the frame 12, slide rail 14, rear fork 18, and lever arm 22 are extrudable, thereby reducing the cost of manufacture.

Figure 6:
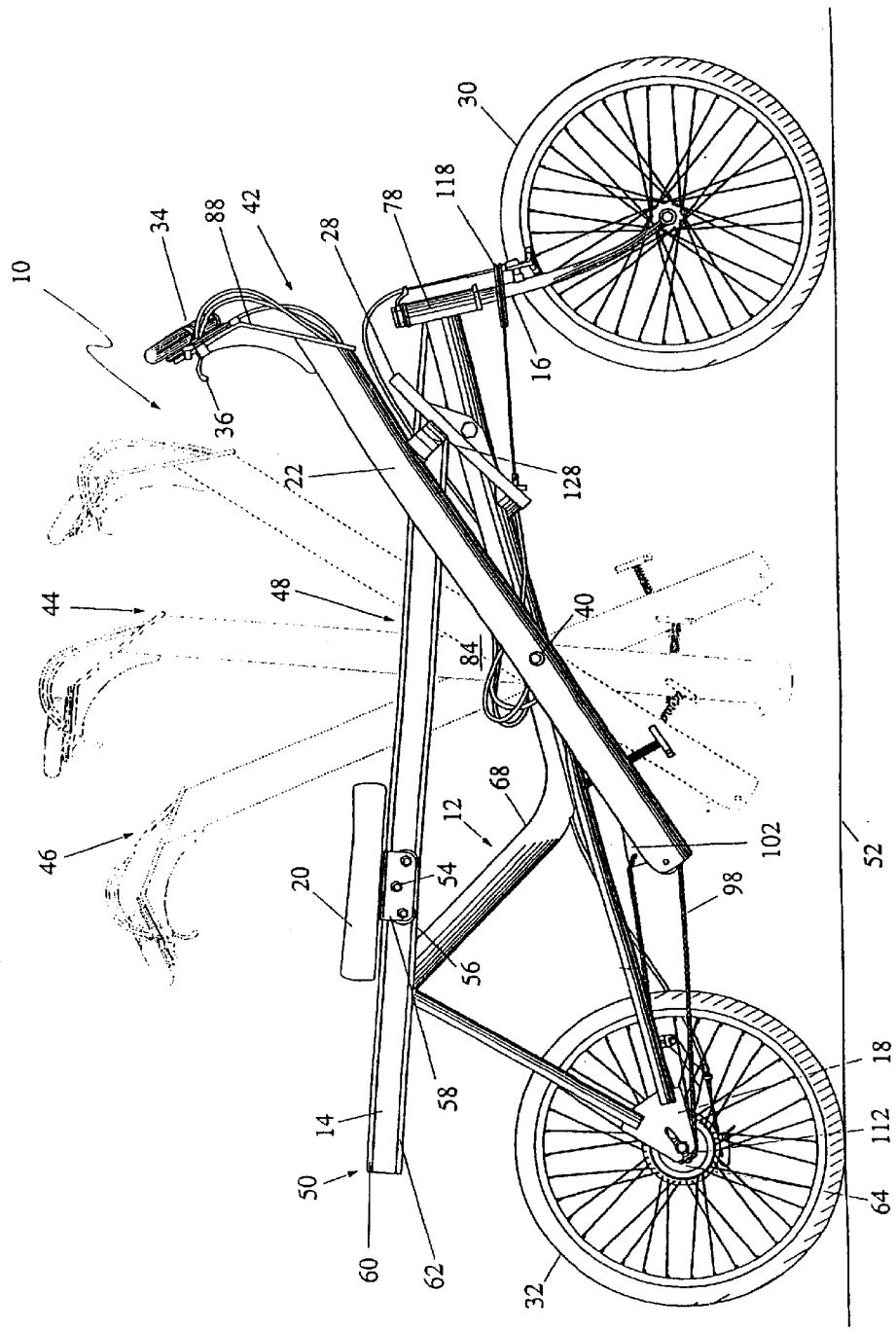
FIG. 6 is a side elevational view of the exercise apparatus shown in FIG. 1, wherein various positions of the lever arm are shown.

In order to completely appreciate the various features of the exercise machine or apparatus 10, the use of the exercise machine 10 will first be discussed. When riding the exercise apparatus 10, the user sits on seat 20, placing the user's feet on footrests 28. Grabbing the handle bars 34, the user may then propel the exercise machine 10 by rowing with the handle bars 34 and attached lever arm 22. The lever arm 22 pivots about its fulcrum 40, from a forward position 42, through a mid position 44, to a fully extended rearward position 46 (see FIG. 6). The user rows with the lever arm 22 and handle bar 34 by periodically pulling the lever arm 22 back to its fully extended rearward position 46 and then pushing the lever arm 22 forward to its forward position 42.

As the user rows with the lever arm 22 and handle bars 34, the seat 20 slides between a first forward position 48 and a second rearward position 50. The row bike 10 is designed and assembled, such that the slide rail 14 is aligned at a slight angle relative to the underlying horizontal plane or riding surface 52 (see FIGS. 2 and 6). This slight angle provides a forward tilt, whereby the seat 20 tends to slide forward towards its forward position 48, assisting the user in moving towards the forward position 48 and providing a slight amount of resistance in moving towards the seat's rearward position 50.

Inherent with the sliding of the seat 20 between the forward and rearward positions 48 and 50, the user pushes and pulls against both the handle bar 34 and footrest 28, thereby exercising the major muscle groups of both the upper and lower body. Offset upper and lower wheels 54 and 56 attached to the seat 20 by seat bracket 58 (see FIGS. 2 and 3) slide along the upper and lower tracks, 60 and 62 respectively, of slide rail 14, providing a smooth sliding seat 20 along the slide rail 14.

The exercise machine or apparatus 10 is powered by drive mechanism 26, which translates the force of the lever arm 22 to the rotation of the rear wheel 32. An internal gearing within the hub 64 of the rear wheel 32 allows the user to select the desired torque required to rotate the rear wheel 32. A portion of the drive mechanism 26 is contained within the lever arm 22 (see FIGS. 1, 2, and 5), reducing the potential of the user's clothing or accessories getting caught in the drive mechanism 26.

The user steers the apparatus 10 by rotating the handle bar 34 clockwise or counter-clockwise. The steering mechanism 24 translates the rotational displacement of the handlebar 34 to the angular displacement of the front wheel 30 (see FIGS. 1 and 4). The user may steer the exercise machine 10 while rowing the lever arm 22.

Figure 7:
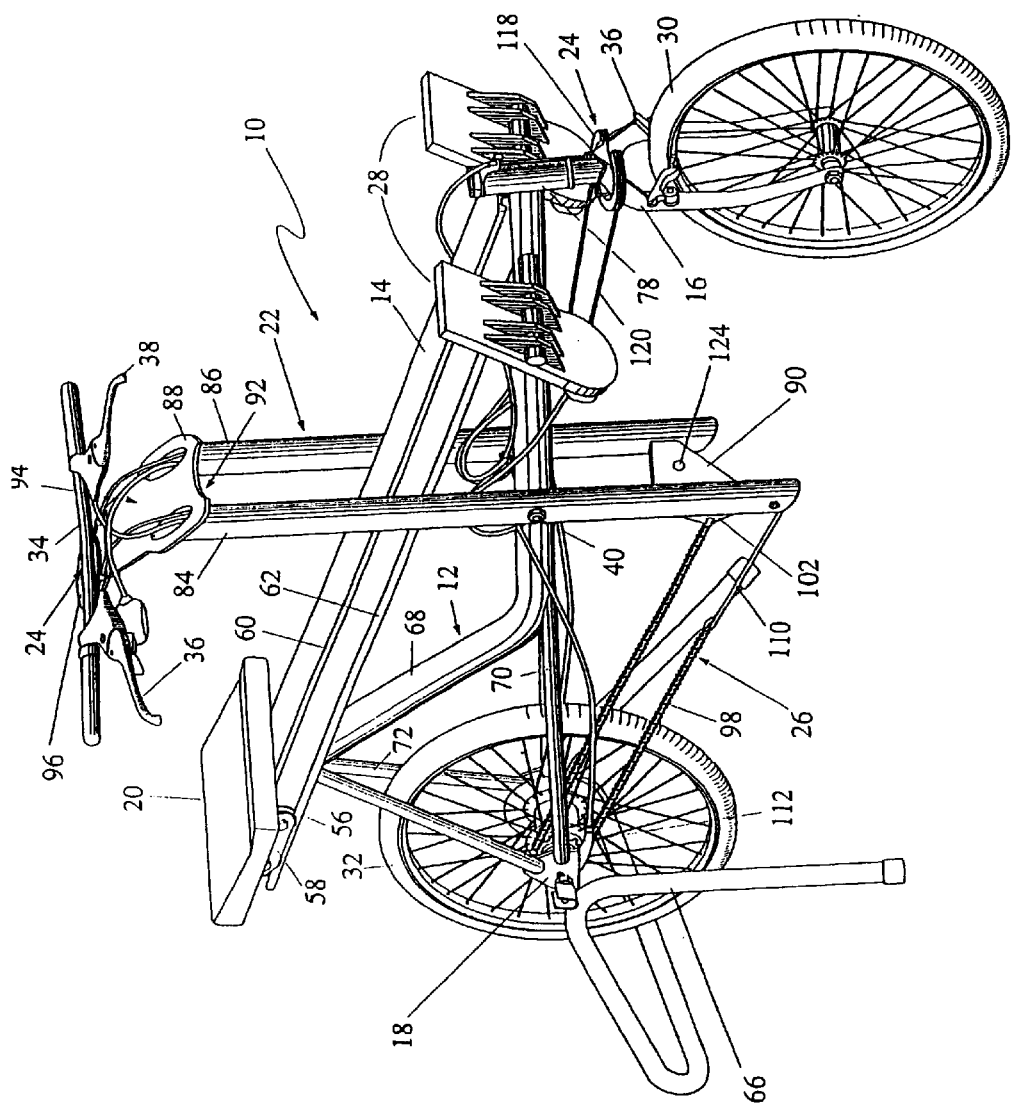
FIG. 7 is a perspective view of the exercise apparatus of the present invention mounted on a stationary stand.

The user may use the exercise apparatus 10 as either an outdoor exercise or recreational vehicle or may use the exercise apparatus 10 as stationary exercise equipment. The rear wheel 32 may be elevated above surface contact by a stationary stand 66 (see FIG. 7), allowing the user to row with the exercise apparatus 10, while remaining in a fixed position.

Turning now to the specific components of the preferred embodiment, the frame 12 comprises a main support member 68, chain stay 70 and seat stay 72 (see generally FIGS. 1–7 and also FIGS. 12–15). A forward end of the chain stay 70 and seat stay 72 respectively are attached to the main support member 68 by known means, and the aft end of the chain stay 70 and seat stay 72 are attached to rear fork 18 by known means, welding being preferred. Each end of the main support member 68 is attached to the slide rail 14. The exercise machine 10 is designed and assembled, such that the slide rail 14 is aligned at a slight angle relative to the underlying horizontal plane or riding surface 52 (see FIG. 2). The slight angle may be accomplished by elevating the rear end 74 of the main support member 68 slightly above the front end of the main support member 68. Of course, a rear wheel 32 having a slightly larger diameter than the front wheel's 30 diameter may be used to accomplish the slight forward angle.

The slide rail 14 has an I-beam construction, with each side having upper and lower tracks 60 and 62 respectively (see FIG. 13) extending from each edge of the slide rail's I-beam. The seat 20 has a plurality of upper and lower wheels 54 and 56 rotatably attached to the seat bracket 58. The bracket 58 is aligned with slide rail 14 such that, on each side of the rail 14, a pair of spaced apart lower wheels 56 rotate on the lower track 62. The upper wheel 54 is offset and aligned between the pair of spaced apart lower wheels 56, and rotates on the upper track 60 (see also FIGS. 2 and 3). As the seat 20 slides along the rail 14, the positioning of the plurality of offset wheels 54 and 56 provides a smooth sliding motion, inhibiting the seat 20 from rocking forward and aft or from side to side.

A steering hub 78 is attached by known means to the forward end 76 of the main support member 68. The steering hub 78 accepts and supports a steering axle 80 of front fork 16. The steering axle 80 rotates within a bore 82 of steering hub 78. Bearings and fasteners of known construction are used to attach the steering axle 80 of the front fork 16 within the steering hub 78. The fork 16 is designed with a slight bend (see FIGS. 10 and 11) to absorb an amount of shock as the front wheel 30 rolls over bumps. Posts 81 extend from the front fork 16, to which front brake calipers 36, of known construction, are mounted.

Figures 16, 17:
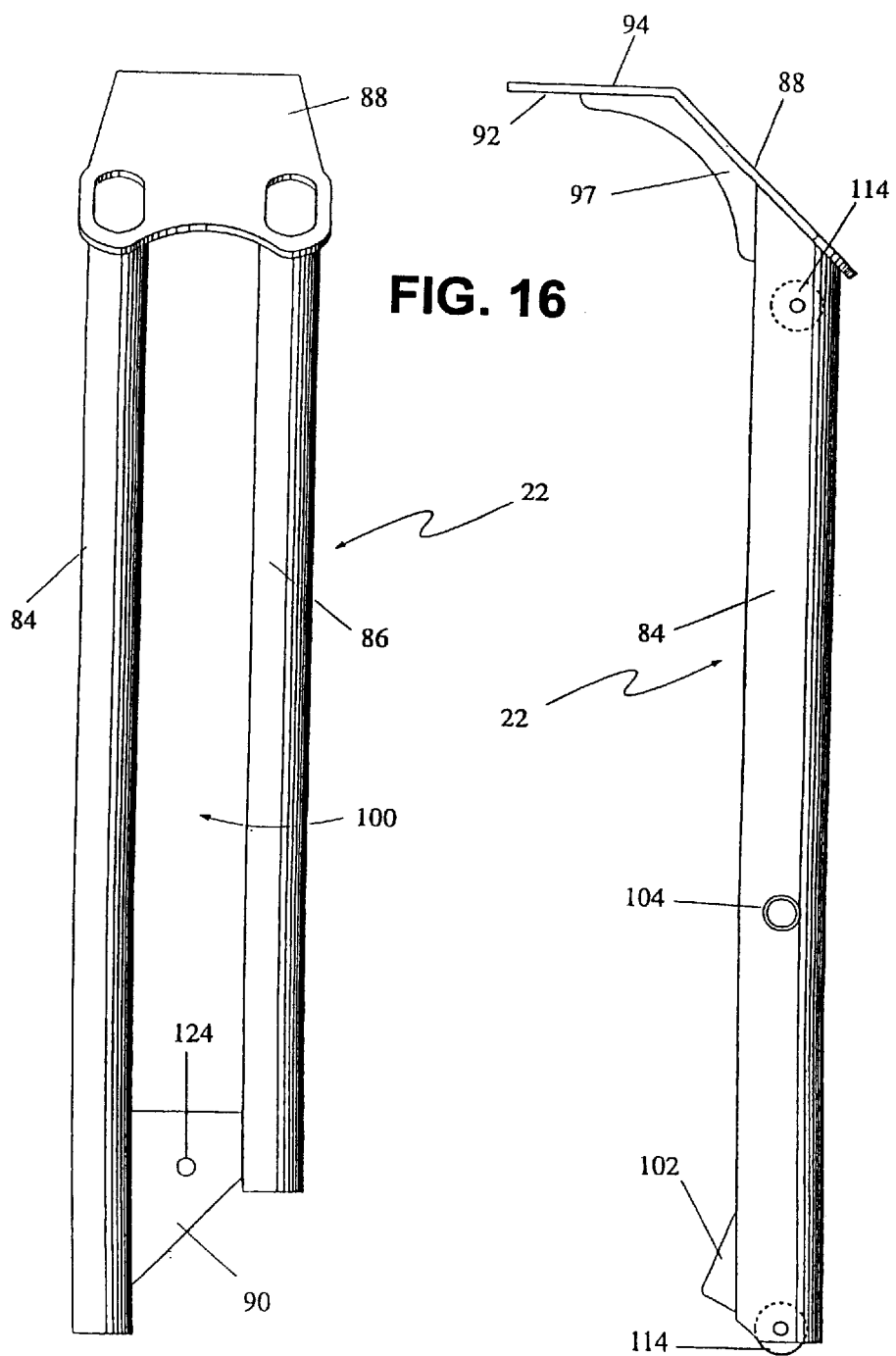
FIG. 16 is a front elevational view of the lever arm of the present invention.
FIG. 17 is a side elevational view of the lever arm shown in FIG. 16.

Referring now to FIGS. 16 and 17, the lever arm 22 of the preferred embodiment is shown. The lever arm 22 comprises hollow spaced apart proximal and distal tubes 84 and 86 interconnected by an upper steering bracket 88 and lower drive bracket 90. One end of the upper steering bracket 88 is attached to the upper end of each tube 84 and 86, where the upper end of each tube 84 and 86 angles at approximately 45E relative to the longitudinal axis of each tube. In the preferred embodiment, one end of the lower surface 92 of the steering bracket 88 is welded to the angled end of each tube 84 and 86. The other end of the upper steering bracket 88 is angled downward at approximately 45E, whereby a steering cam 96 and handle bar 34 are pivotally attached to the upper surface 94 of steering bracket 88. In this manner, when the user pulls on the handle bars, less force is exerted against the welding between the steering bracket 88 and tubes 84 and 86. A reinforcing brace 97 is also attached to the lower surface 92 of the steering bracket 88 and the sides of tubes 84 and 86, thereby providing additional support, when the user pushes and pulls against the handle bar 34.

The lower bracket 90 is attached to a side of each tube 84 and 86 below the frame 12. The lower bracket 90 is designed to allow simple attachment of a chain 98 of the drive mechanism 26 to a flange 102 of the lower bracket 90. The flange extends from the lower bracket 90 and is adjacent to the proximal tube 84.

The frame 12 of the exercise machine or apparatus 10 is positioned in gap or opening 100 between the proximal and distal tubes 84 and 86. Both the proximal and distal tubes 84 and 86 have a bore 104 extending therethrough, perpendicular to the longitudinal axis of each tube. A corresponding bore 106 extends through the main support frame 68. The bores 104 and 106 are aligned and a rotation pin 108 is inserted through the bores 104 and 106 of the tube and frame.

The lever arm 22 rotates about the rotation pin 108, whereby the rotation pin 108 acts as the fulcrum 40 of the lever arm 22. The user pulls on each end of handle bar 34 in order to rotate the lever arm 22 about rotation pin 108. In use, the use might exert a force against one end of the handle bar 34, greater than the force exerted on the other end of the handle bar 34. In this circumstance, the rotation pin 108 could become damaged if there is enough leverage to bend the rotation pin. By centering the frame 12 on rotation pin 108 between tubes 84 and 86, the likelihood of bending the rotation pin 108 is reduced. The torque provided by the rearward rotation of the lever arm may be increased or decreased by changing the position of the fulcrum 40 along the longitudinal axis of the lever arm 14.

Those skilled in the art will recognize that the plurality of bores 104 may be spaced along the longitudinal axis of each tube 84 and 86, to thereby allow quick, variable positioning of the fulcrum 40. In this manner the user may vary the amount of torque provided by the lever arm 22 depending upon the intended use. Without any limitation intended, the user may desire a fulcrum 40 closer to the bottom of the lever arm 22 when rowing the exercise machine or apparatus 10 up hills, or a fulcrum 40 closer to the longitudinal center of the lever arm 22 when rowing on flat riding surfaces. Of course, the position of the flange relative to the fulcrum 40 will also affect the amount of torque provided by the rearward rotated lever arm 22.

Figure 18:
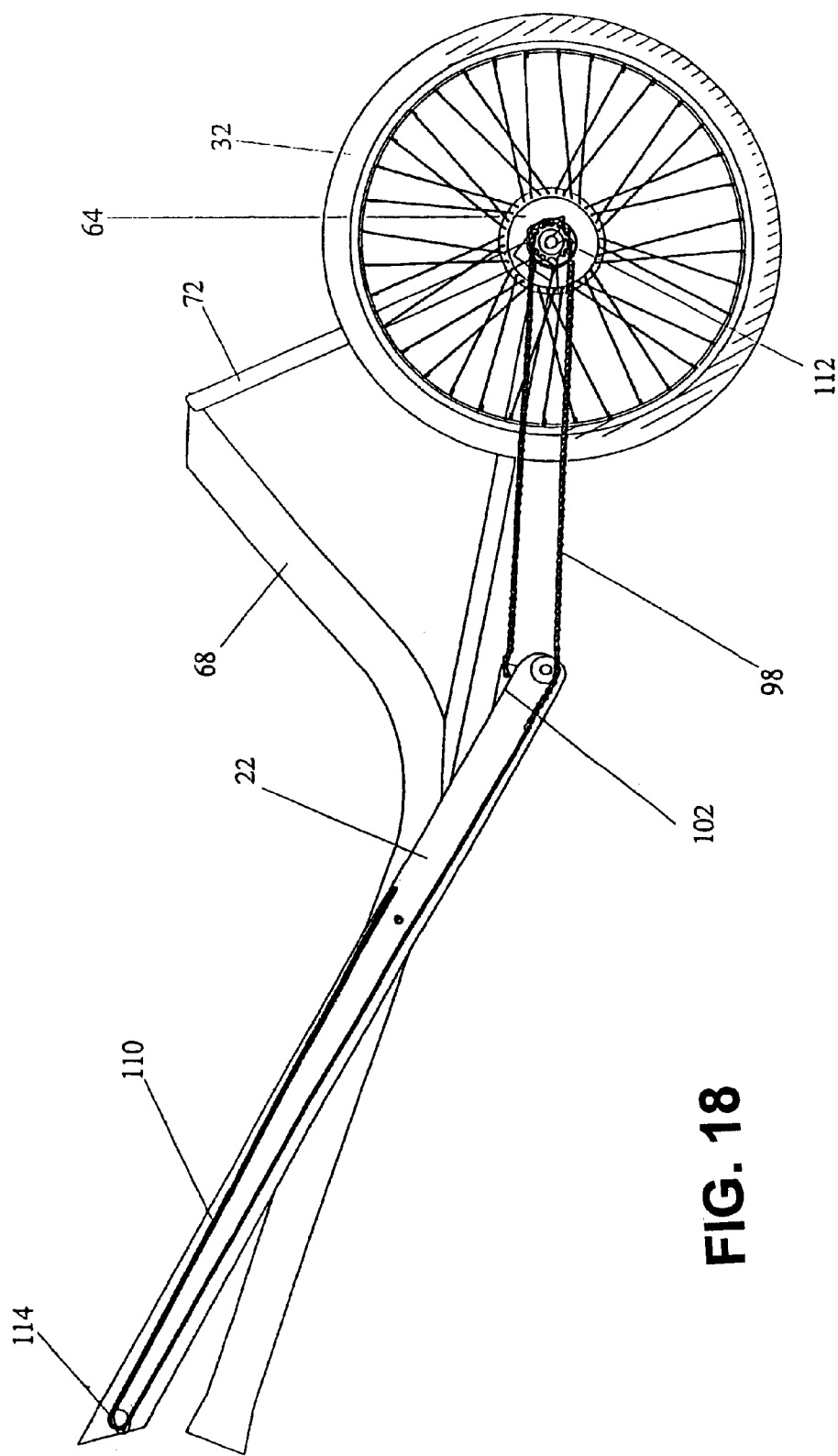
FIG. 18 is an enlarged fragmentary view of an alternate orientation of the drive mechanism of the present invention.
Figure 19:
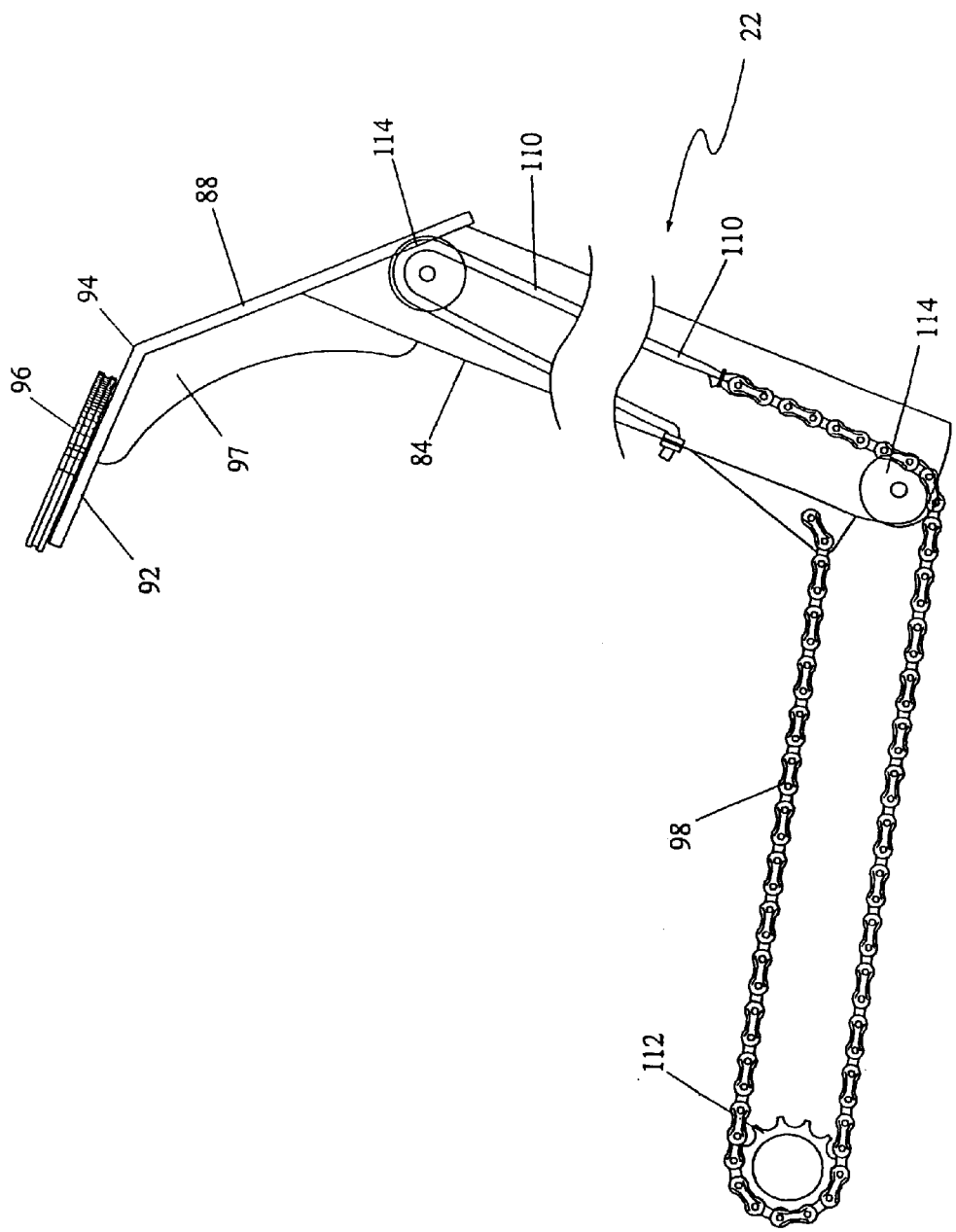
FIG. 19 is an enlarged sectional fragmentary view of the lever arm and drive chain of the present invention.

Referring next to FIGS. 18 and 19, the drive mechanism 26 is shown attached to the flange 102 and includes drive chain 98, resilient member 110, and sprocket 112. The sprocket 112 is attached to the hub 64 which has internal gearing and internal rear brake 38, both of which are of known construction to those skilled in the art. One end of the drive chain 98 is attached to flange 102. The drive chain 98 wraps around sprocket 112, and is connected to resilient member 110. The resilient member extends into hollow proximal tube 84. A pair of pulleys or wheels 114 are rotatably attached within the hollow proximal tube 84 near each end. The resilient member 110 wraps around the lower wheel, up and around the upper wheel, and back towards the open lower end (see FIG. 19). Resilient member, gear cable, brake cables and steering cables all extend through a portion of either the proximal or distal tubes 84 and 86, thereby reducing the likelihood that the user's clothing or accessories will get caught therein.

The free end of the resilient member 110 extends through an aperture formed in the side of the proximal tube 84. A tie down 116 of known construction is used to adjust the length and tension of resilient member 110. In use, the tension of the resilient member 110 can be adjusted so that as the user pulls the lever arm 22 to its fully extended rearward position 46, the resilient member 110 stretches extending out the lower end of the proximal tube 84 (see FIGS. 1 and 7). When the user stops pulling against the handle bar 34, the resilient member 110 tends to return to its original shape, thereby forcing the lever arm 22 to its forward position 42. When the lever arm 22 is in its forward position 42, the chain 98 extends into the proximal tube 84 and around the lower wheel 114 (see FIGS. 2, 5, 18, and 19).

Figure 8:
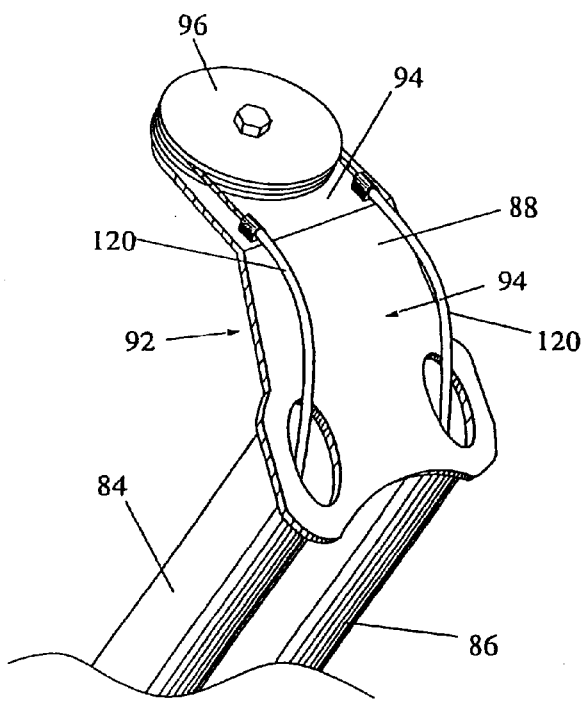
FIG. 8 is a n enlarged fragmentary view of the steering cam of the present invention with the handlebars removed.
Figure 9:
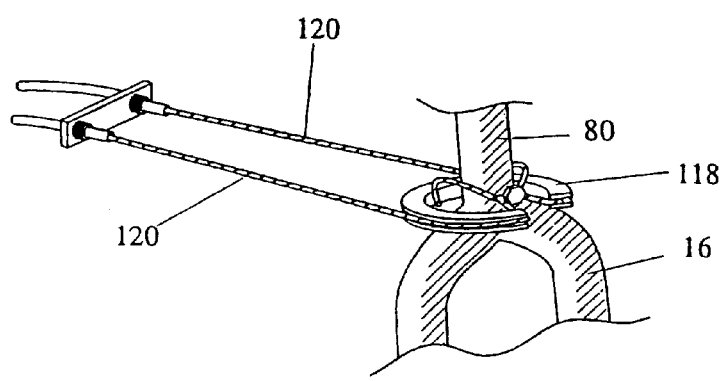
FIG. 9 is an enlarged fragmentary view of the steering guide of the present invention.
Figure 12:
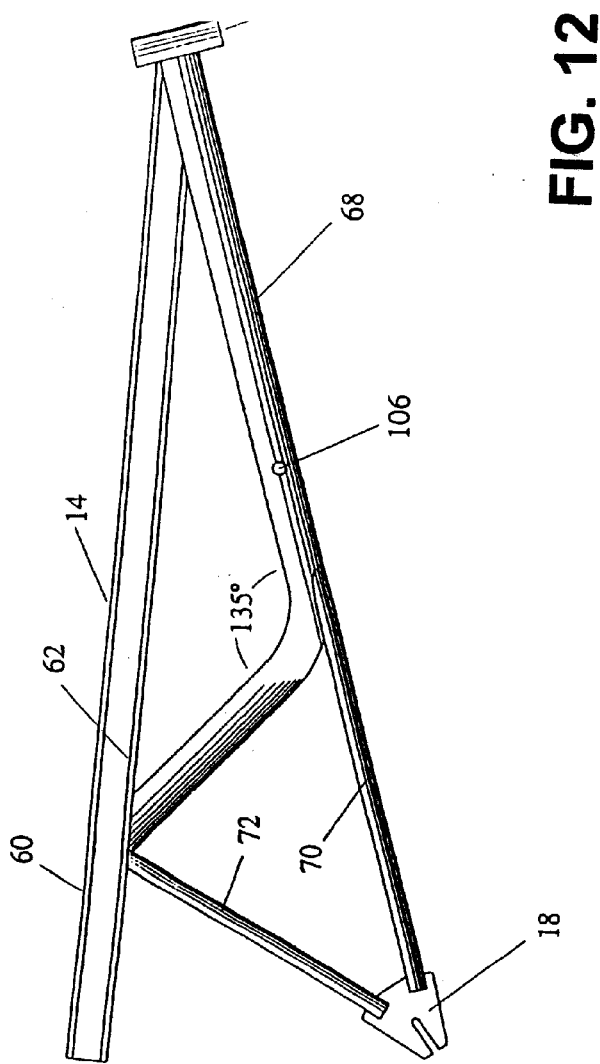
FIG. 12 is a side elevational view of the frame of the present invention.
Figure 13:
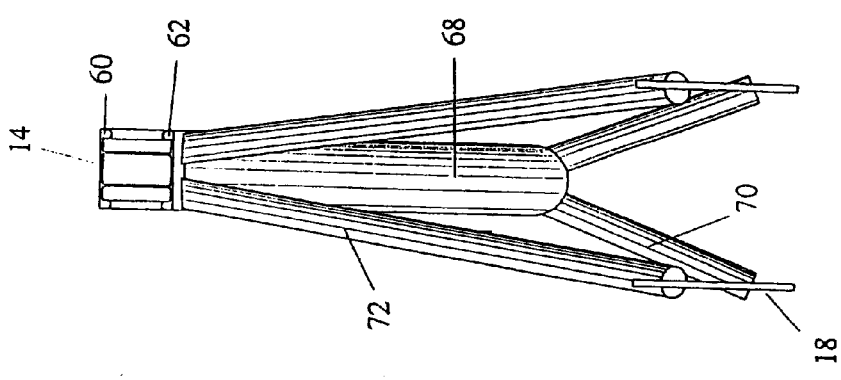
FIG. 13 is a back elevational view of the frame shown in FIG. 12.

Referring next to FIGS. 8 and 9, portions of the steering mechanism 24 are shown. The steering cam 96 is rotatably attached to the upper surface 94 of the steering bracket 88. Likewise, a second steering cam 118 is attached to front fork 16. An adjustable steering cable 120 links first and second steering cams 96 and 118. The cable 120 is held taught by known means, whereby rotating the first steering cam 96 in turn rotates the second steering cam 118. Hence, a rotational displacement of the handle bar 34 corresponds with an angular displacement of the front fork 16. The handle bar 34 may be rotated clockwise or counter-clockwise while the user rows with the lever arm 22 and handle bar 34.

Figure 2:
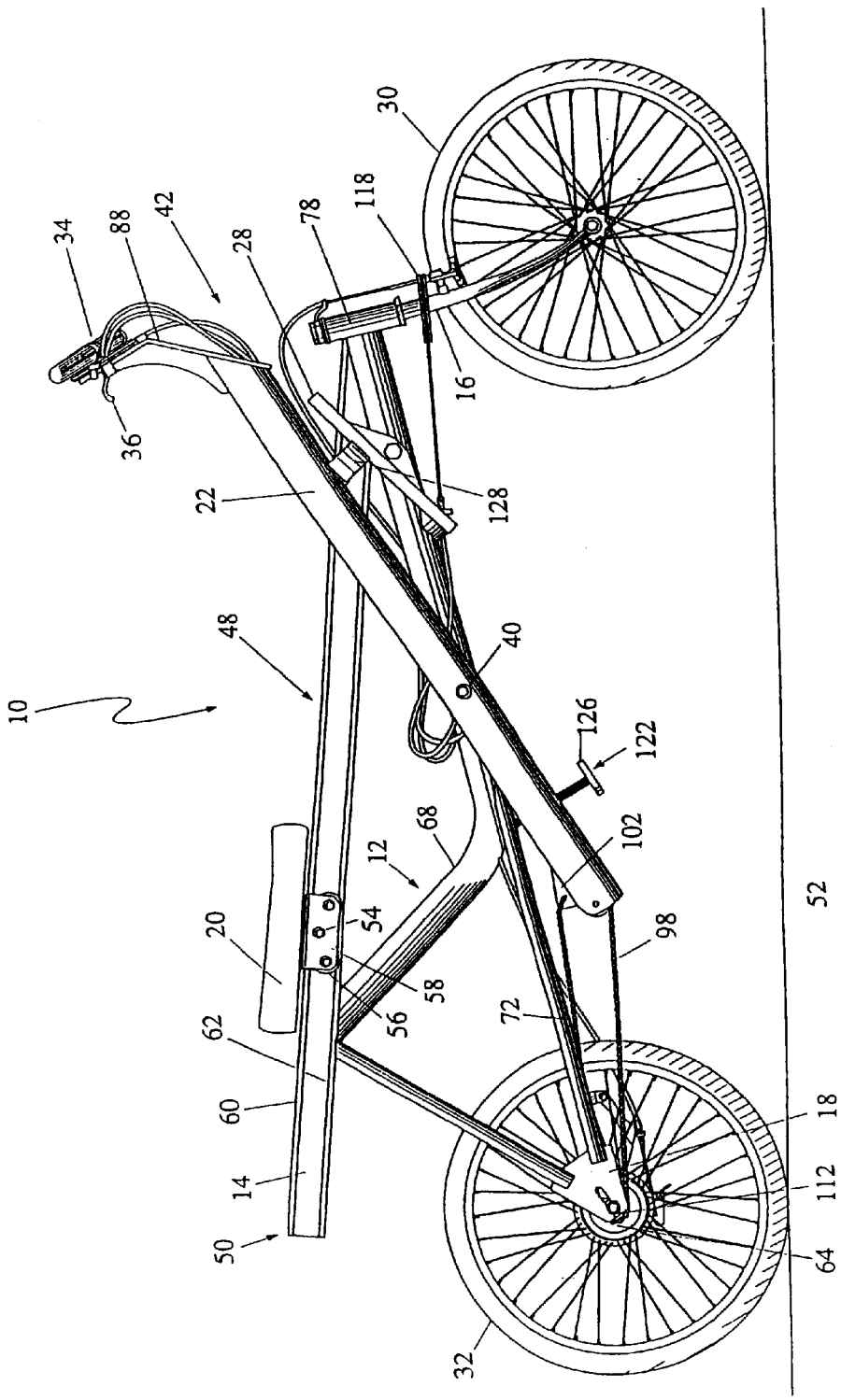
FIG. 2 is a side elevational view of the exercise apparatus shown in FIG. 1.
Figure 3:
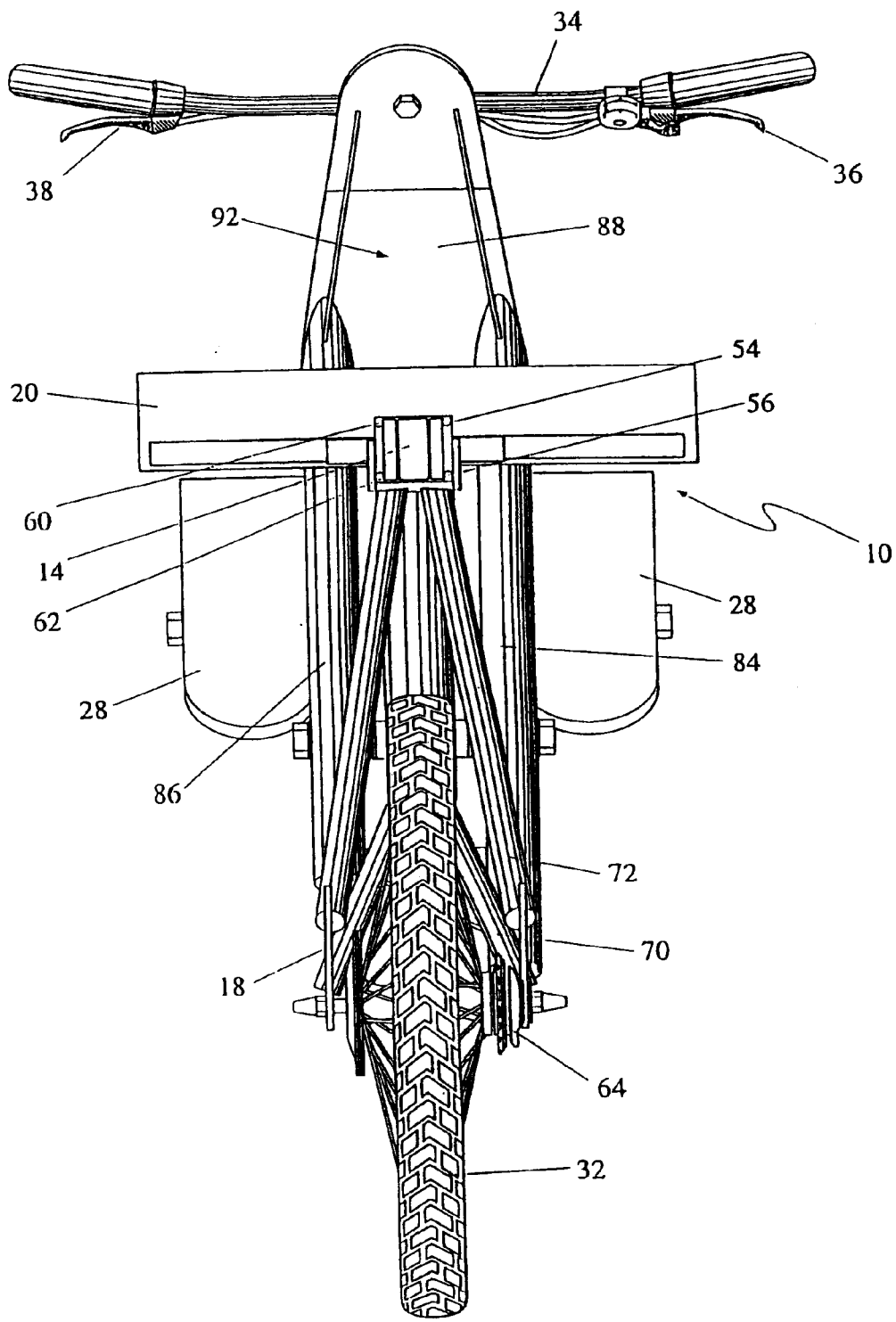
FIG. 3 is a back elevational view of the exercise apparatus shown in FIG. 1.
Figure 4:
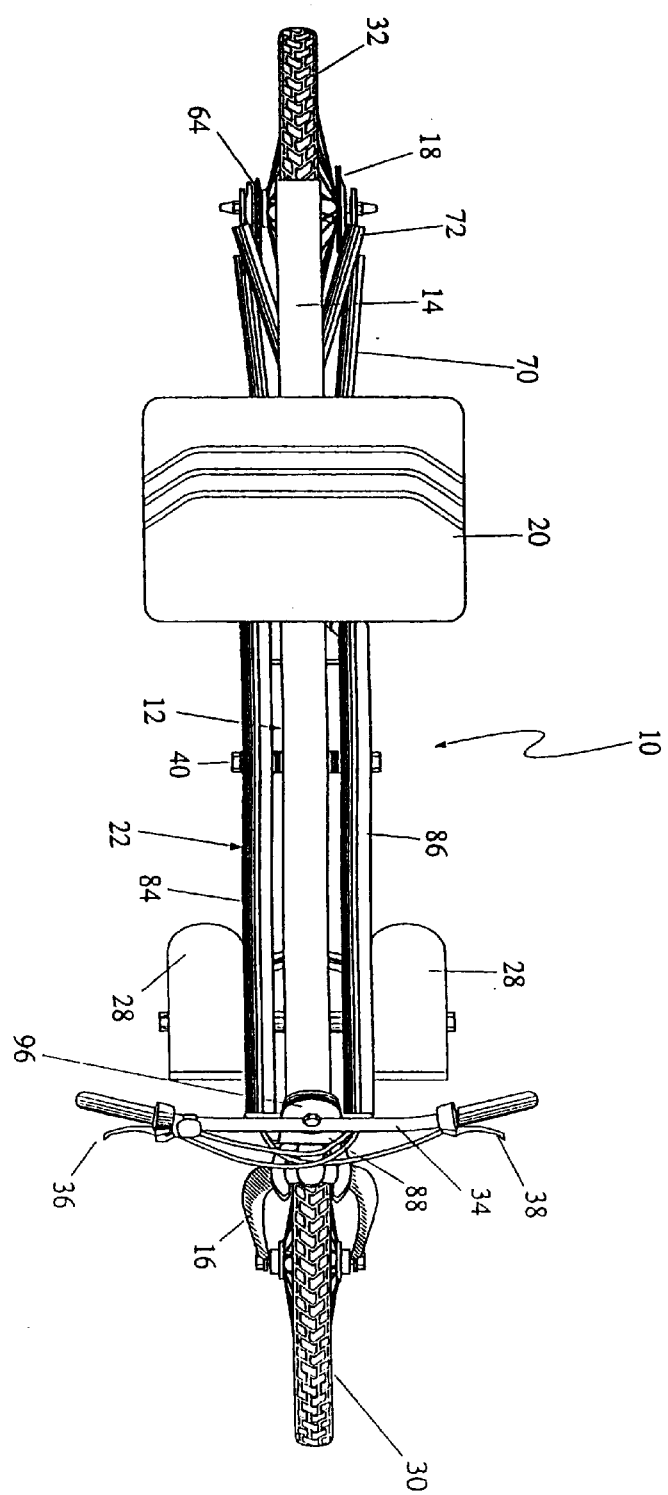
FIG. 4 is a top plan view of the exercise apparatus shown in FIG. 1.
Figure 5:
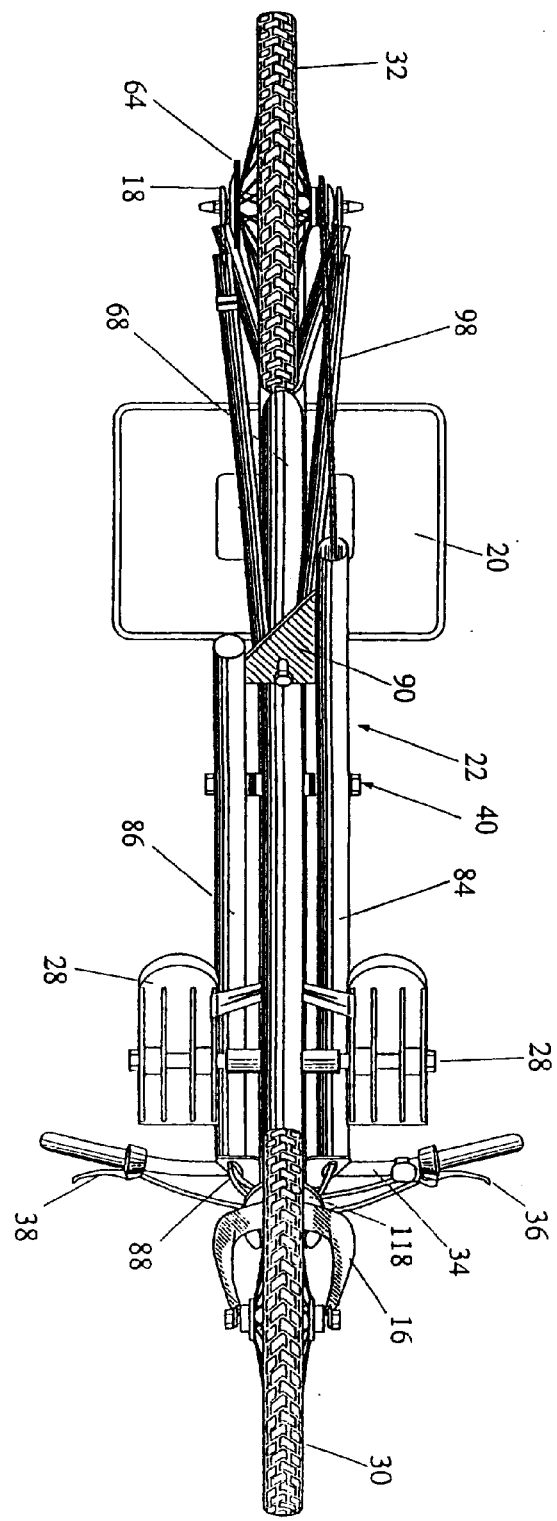
FIG. 5 is a bottom plan view of the exercise apparatus shown in FIG. 1.
Figure 20:
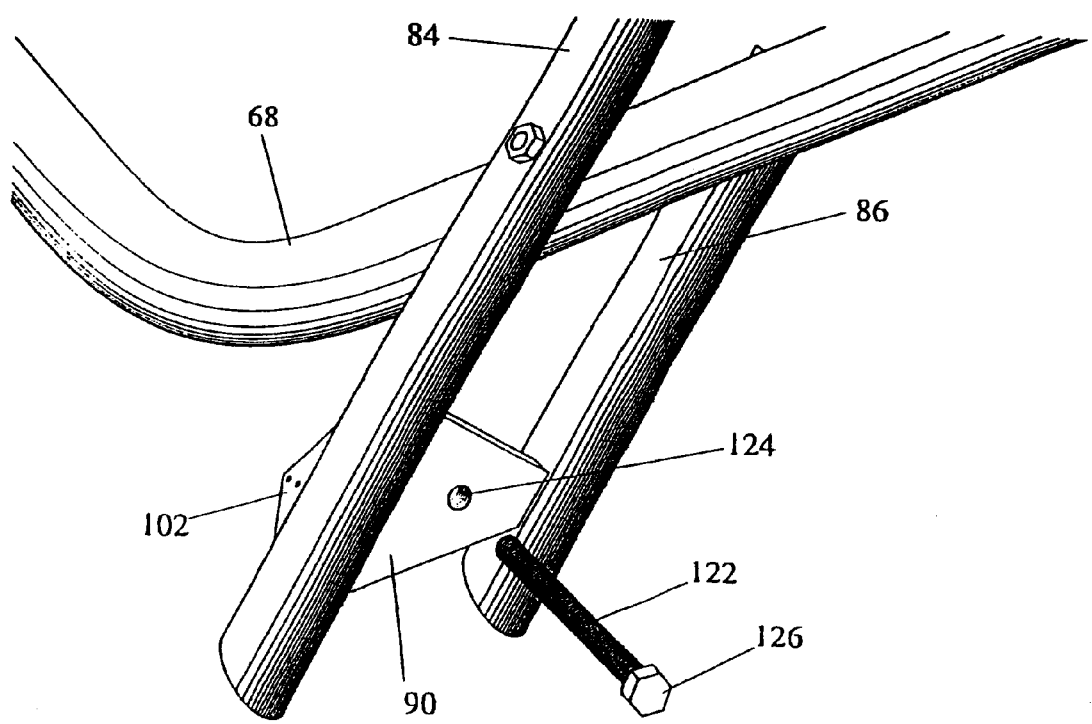
FIG. 20 is an enlarged fragmentary perspective view of the lever arm travel adjustment of the present invention.

A travel stop 122 rotates through a threaded bore 124 of the lower drive bracket 90 (see FIGS. 2 and 20). A handle 126 is attached at one end of the stop 122. The other end of the stop 122 contacts the main support member 68 when the lever arm 22 is in its fully forward position. The length of travel stop 122 extending from the lower drive bracket 90 is adjustable by screwing the travel stop either clockwise or counter-clockwise. Hence, the fully forward position 42 of lever arm 22 is adjustable by varying the length of the travel stop 122 extending from the lower drive bracket 90.

A footrest 28 extends from the proximal and distal sides of the main support member 68. Adjustable straps 128, of known construction, are attached to each footrest 28 (see FIG. 2). The user's feet may be strapped to the footrest 28, thereby preventing the user's feet from slipping from the footrest 28. Each footrest 28 pivots around a rotation axis as the user rows the exercise machine 10. A stop may be used to limit the arc through which the footrest 28 pivots.

The axles of front and rear wheels 30 and 32 are mounted to the front and rear fork 16 and 18 respectively. The wheels are preferably mounted with locking nuts known in the art as quick release mounts. The wheel diameter and width varies depending upon the terrain intended to be traveled.

Figure 21:
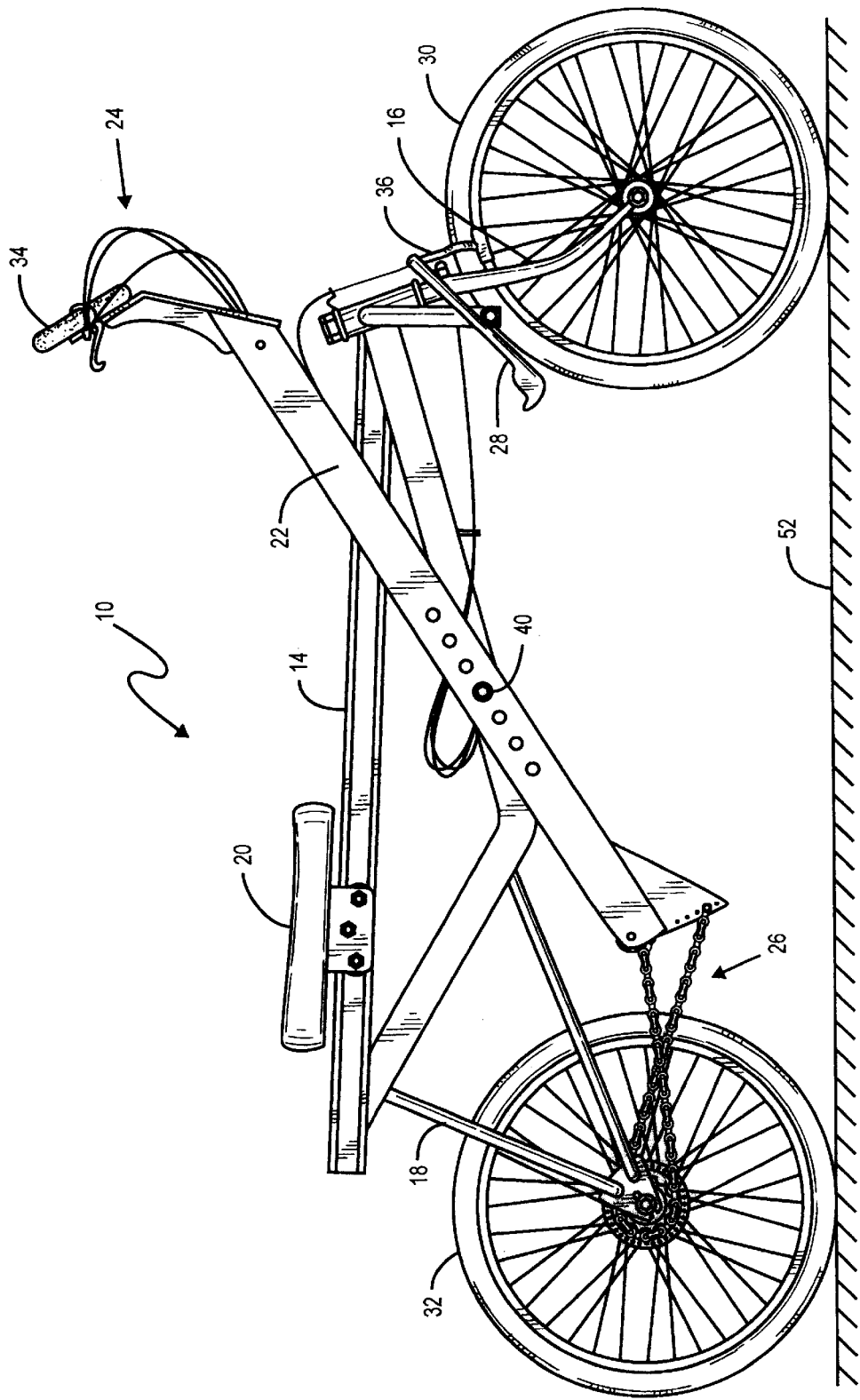
FIG. 21 is a side elevational view of an alternate preferred embodiment of the exercise apparatus of the present invention shown positioned on the riding surface.

Referring now to FIG. 21 an alternate embodiment of the exercise apparatus 10 is shown. The exercise apparatus 10 includes a frame 12, slide rail 14, front and rear forks 16 and 18 respectively, seat 20, lever arm 22, steering mechanism 24, drive mechanism 26, foot rest 28, front and rear wheels 30 and 32 respectively, steering handle bar 34, and front and rear brakes 36 and 38 respectively. Those skilled in the art will appreciate that the footrests may include a fastening means of known suitable construction to allow vertical adjustment of the footrest on the frame 12. The lever arm 22 is rotatably attached to the frame 12 about its fulcrum 40. Without any limitation intended, the frame 12, slide rail 14, rear fork 18, and lever arm 22 are all constructed from a high grade, lightweight aluminum alloy. Those skilled in the art will appreciate that components of the frame 12, slide rail 14, rear fork 18, and lever arm 22 are extrudable, thereby reducing the cost of manufacture.

Figure 22:
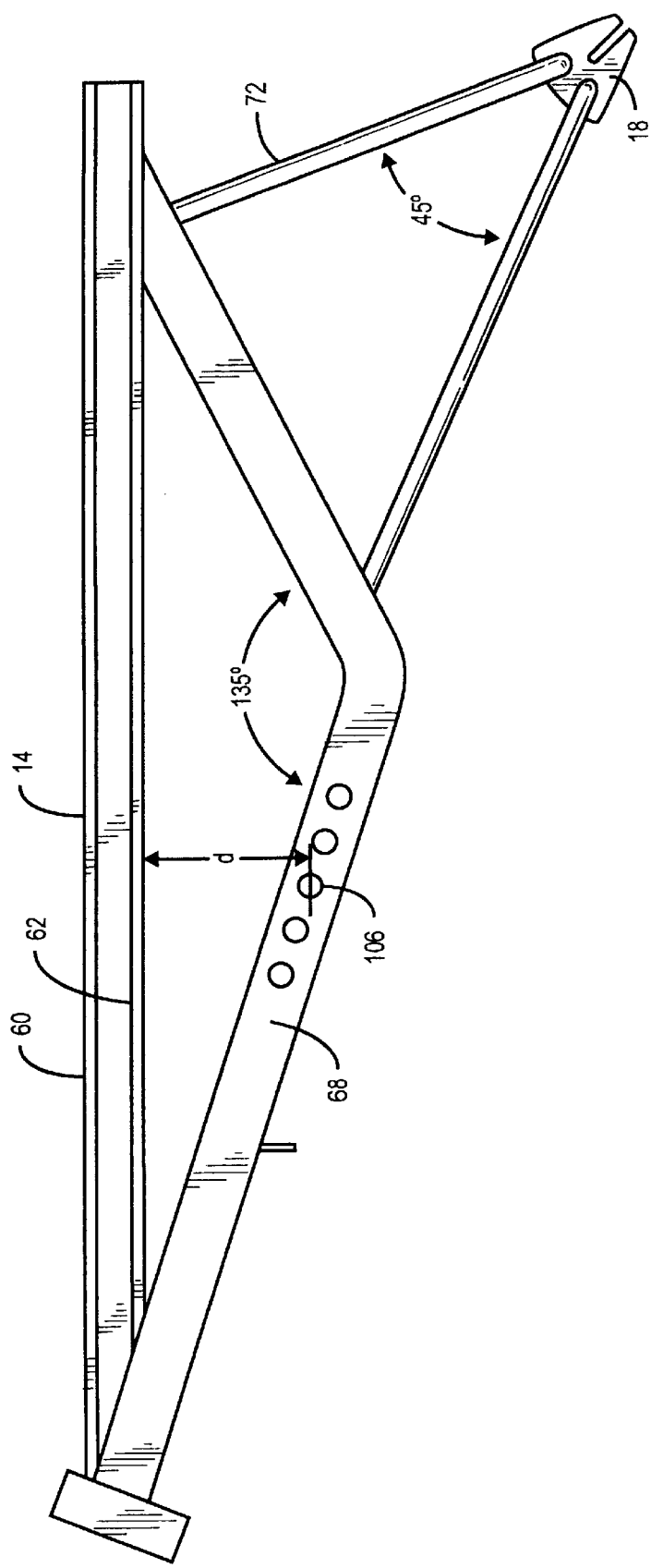
FIG. 22 is a side elevational view of the slide rail and frame of the exercise apparatus shown in FIG. 21.

FIG. 22 shows the frame 12 mounted to the slide rail 14. The frame 12 includes a main support member 68, wherein each end of the main support member 68 is attached to the slide rail 14. The rear fork 72 is dimensioned and attached to the frame at an angle so that when the rear wheel is attached at 18 the slide rail 14 is aligned at a slight angle relative to the underlying horizontal plane or riding surface 52 (see FIG. 21). The slide rail 14 has an I-beam construction, with each side having upper and lower tracks 60 and 62 respectively extending from each edge of the slide rail's I-beam. A plurality of bores 106 are formed in the frame 68, thereby allowing adjustment of the rotation point of the lever arm relative to a point on the slide rail 14.

Figure 23:
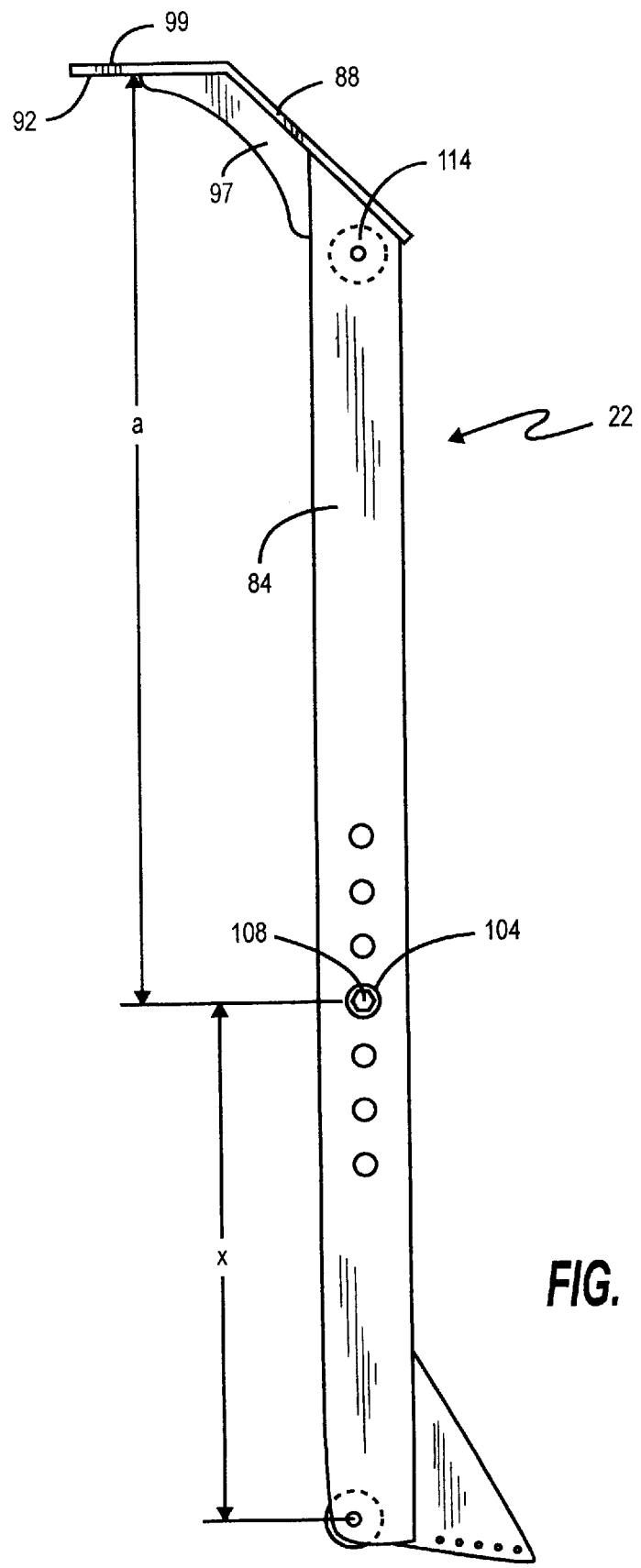
FIG. 23 is a side elevational view of the lever arm of the exercise apparatus shown in FIG. 21.

FIG. 23 illustrates a suitable lever arm 22 as described above for rotational attachment to the frame 12. The lever arm 22 includes a bore 104 extending therethrough, which corresponds with bore 106 extending through the main support frame 68. The bores 104 and 106 are aligned and a rotation pin 108 is inserted through the bores 104 and 106 of the tube and frame. A plurality of bores are shown extending through the lever arm which allows additional adjustment. Those skilled in the art will recognize and appreciate that the distance "a" from the steering bracket 88 to the rotation axis of the rotation pin 108, the distance "x" from the rotation axis of the rotation pin 108 to the lower portion of the lever arm 22, and the distance "d" from the lower portion of the slide rail 14 to the rotation axis of bore 106 may be adjusted proportionate with the others to thereby achieve a maximum torque, maximum stroke distance of the lever arm 22, the maximum resistance to the user's force being applied by the upper and lower body, and/or maximize/minimize other variables desired by the user.

Figure 24:
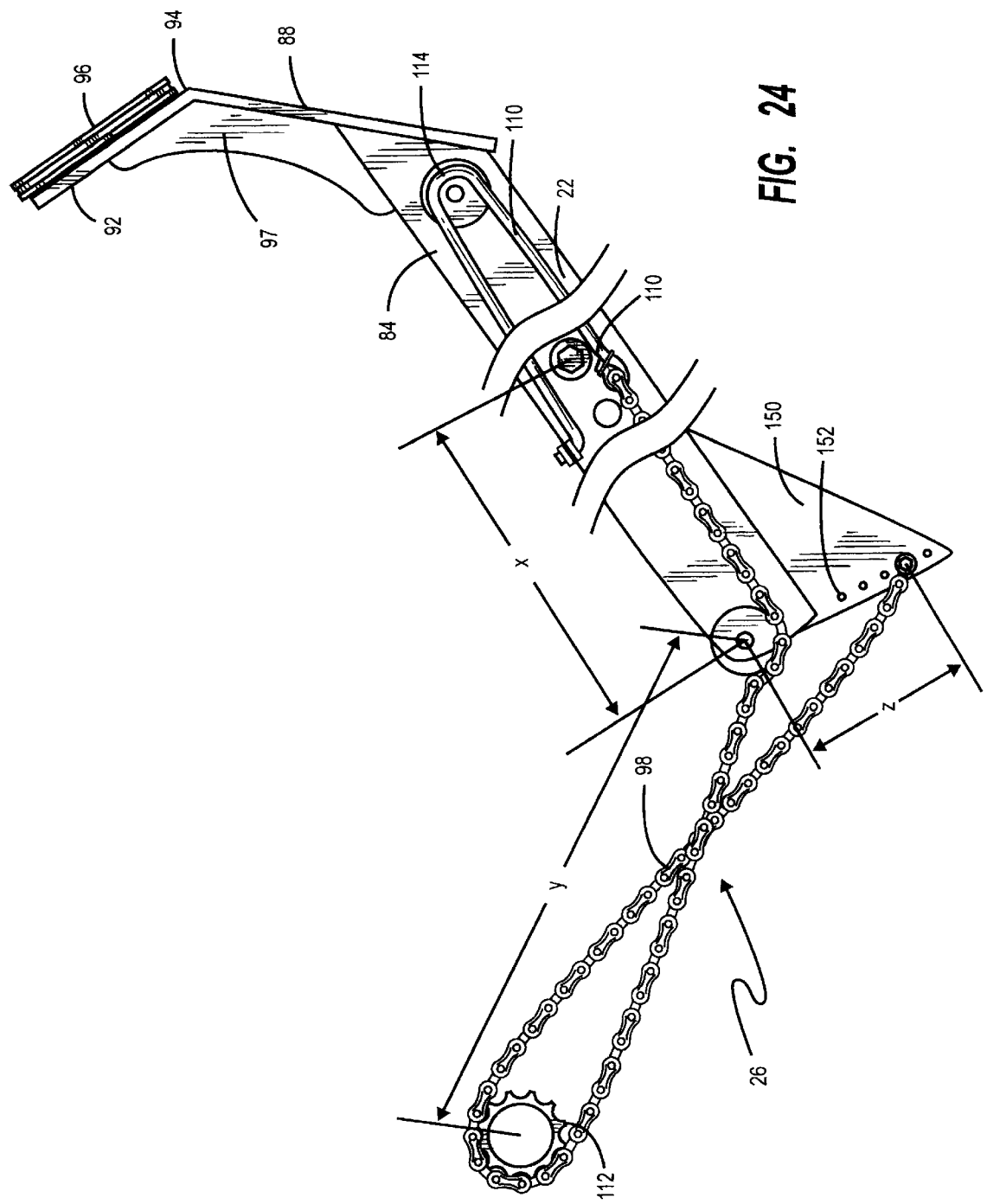
FIG. 24 is an enlarged fragmented side elevational view of the lever arm and drive assembly of the exercise apparatus shown in FIG. 21.

Turning now to FIG. 24 a fragmented view of the lever arm 22 and drive assembly 26 of the type described above is shown. A bracket 150 is shown attached to a lower forward portion of the lever arm 22. The bracket 150 may be attached to the lever arm 22 with a clamp or other fastening means of known suitable construction to allow adjustment of the position of the bracket 150 relative to the bottom of the lever arm 22. The bracket includes a plurality of bores 152 adapted for coupling a first end of the linkage member 98 thereto. The linkage member 98 wraps around the top of the top of sprocket 112 which is attached to a hub of the rear wheel 32, and the second end is then attached to a resilient portion of the lever arm 22. Without limitation, the second end of the linkage member 98 is coupled to a resilient cord or spring 110 contained within the lever arm 22. Those skilled in the art will recognize and appreciate that the distance "d", the distance "a", the distance "x", the distance "y" from the lower portion of the lever arm 22 to the rotation axis of the rear wheel 32, and the distance "z" from the lower portion of the lever arm 22 to the point of attachment of the first end of the linkage member may all be determined dependant upon the other distance to thereby affect the torque, stroke distance of the lever arm 22, the maximum resistance to the user's force being applied by the upper and lower body, and/or maximize/minimize other variables desired by the user. For example, without limitation, as "d" increases and "x" decreases, there is an increase in the distance the first end of the linkage member 98 travels which in turn increases the rear wheel rotation.

Figure 25:
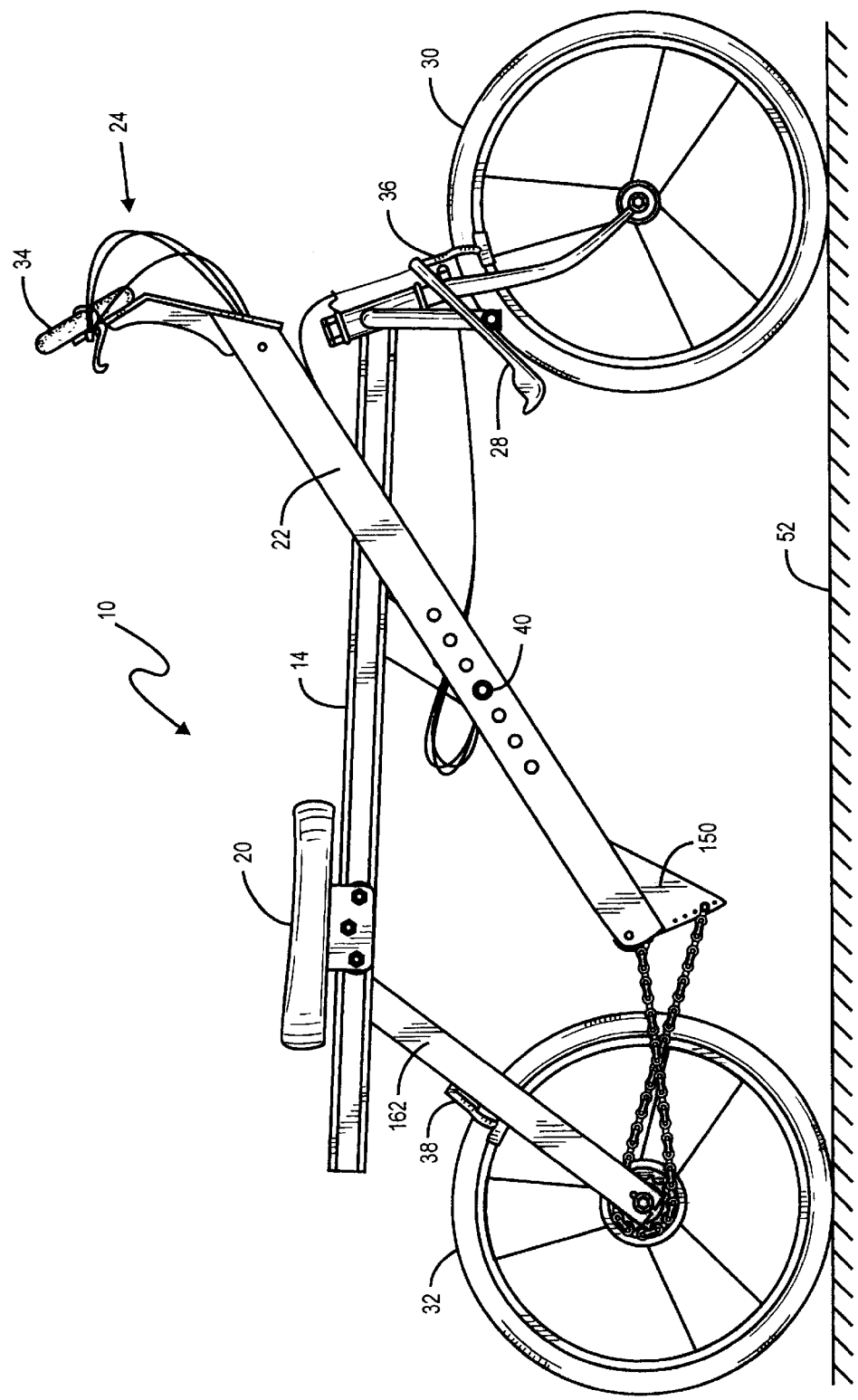
FIG. 25 is a side elevational view of an alternate preferred embodiment of the exercise apparatus of the present invention shown positioned on the riding surface.
Figure 26:
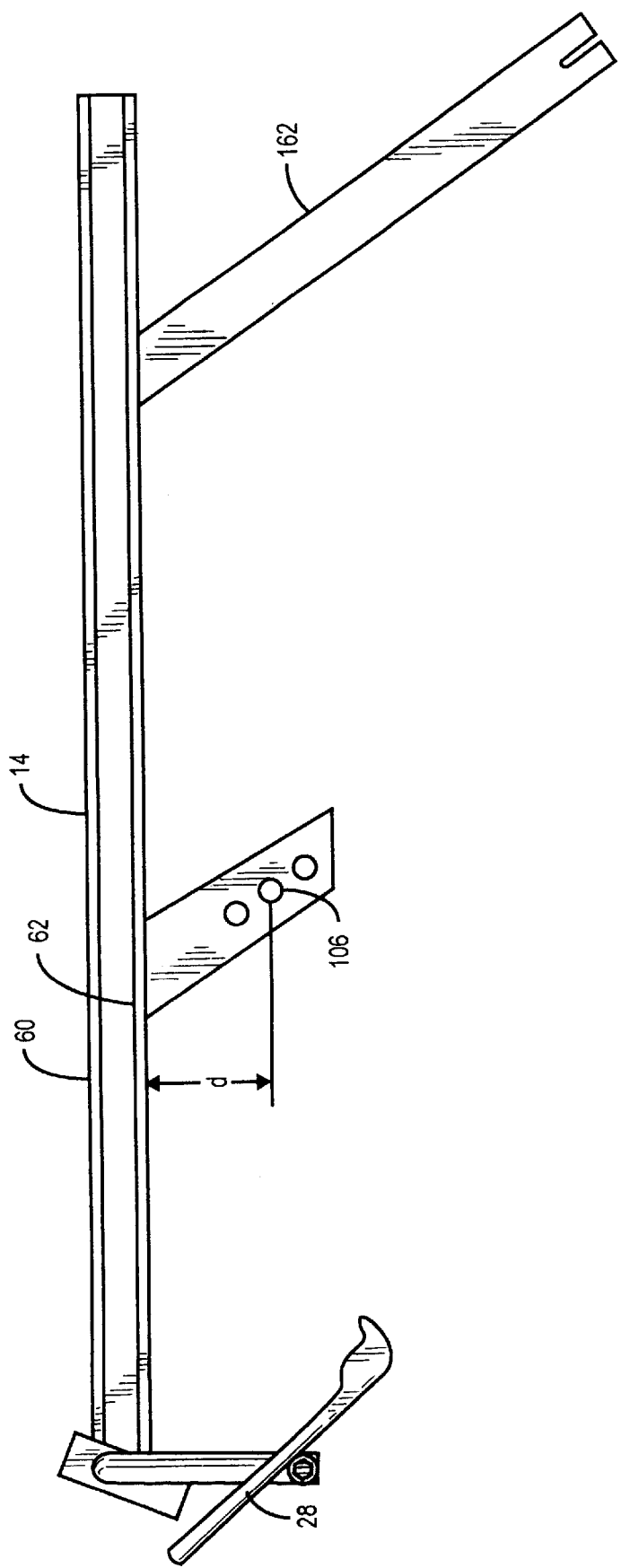
FIG. 26 is a side elevational view of the slide rail and frame of the exercise apparatus shown in FIG. 25.

Referring now to FIGS. 25 and 26, an alternate embodiment of the exercise apparatus 10 is shown. The exercise apparatus 10 includes first and second support members 160 and 162, slide rail 14, seat 20, lever arm 22, steering mechanism 24, drive mechanism 26, foot rest 28, front and rear wheels 30 and 32 respectively, steering handle bar 34, and front and rear brakes 36 and 38 respectively. Those skilled in the art will appreciate that the support member 160 may removeably attached to the slide rail. The lever arm 22 is rotatably attached to the support member 160 about its fulcrum 40. The rear wheel is rotatably attached to the second support member 162. The slide rail 14 has an I-beam construction, with each side having upper and lower tracks 60 and 62 respectively extending from each edge of the slide rail's I-beam. A plurality of bores 106 are formed in the frame 68, thereby allowing adjustment of the rotation point of the lever arm relative to a point on the slide rail 14. The first and second support members 160 and 162 reduce the total amount of materials required and eliminates the several components including the rear fork 18.

Figure 27:
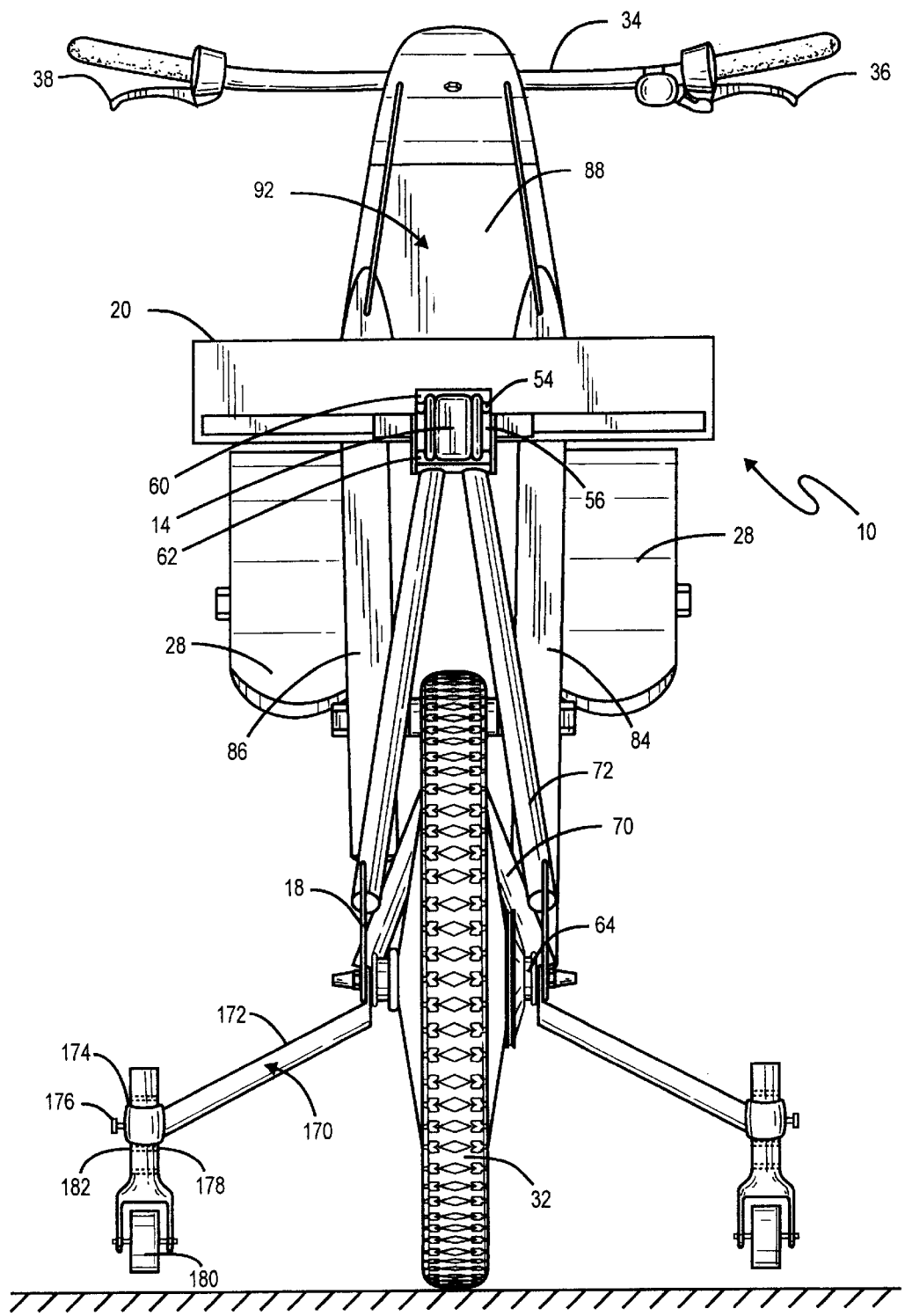
FIG. 27 is a rear elevational view of the exercise apparatus of the present invention having stabilizing members mounted to the rear wheel thereof.

FIG. 27 shows an embodiment of a stabilizing means that may be utilized in conjunction with the present invention. The stabilizing member 170 includes an extension arm 172, coupling 174, pin 176, height adjustment member 178 and wheel 180. The height adjustment member 178 includes a series of bores 182 extending therethrough. A bore extends through the coupling 174 such that a selected bore of the height adjustment member may be aligned and pin 176 extends through both bores to effectively lock the height of the height adjustment member 178. Those skilled in the art will appreciate that a conventional coupling may be utilized that includes a spring or other shock absorbing element within the coupling 174 to thereby allow controlled movement of the height adjustment member 178 within the coupling 174 while the pin 176 is engaged with the coupling 174 and the height adjustment member 178. In use, the user may adjust the height adjustment member so that the wheel 180 is slightly above the riding surface. In this manner, if the exercise apparatus leans past vertical, the wheel 180 will engage the riding surface and provide added stabilization. Alternatively, the user may extend the adjustment member 178 such that the rear wheel 32 is elevated above the riding surface. In this manner, the stabilizing members 170 may be utilized to convert the mobile exercise apparatus to a stationary exercise apparatus.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. An exercise apparatus propelled by a simulated rowing motion to exercisethe upper and lower body muscles, said exercise apparatus having a frame, front and rear wheels rotatably attached to the frame, steering means for controlling the direction of travel of said apparatus, and drive means for translating the user's energy to propel the exercise apparatus, the improvement comprising:
   (a) a slide rail forming a top portion of the frame and having a seat in sliding communication with said slide rail;
   (b) a support member attached to a lower portion of said slide rail and extending downward from said slide rail, wherein said slide rail and said support member lie in a central vertical plane of said apparatus;
   (c) a lever arm rotatably connected to said support member and rotatable between a forward and rearward position; and
   (d) drive means for translating the user's energy to propel the exercise apparatus, said drive means includes a linkage member having a first end attached to lower end of said lever arm and extending upwardly and around a hub of the rear wheel to a second end of said linkage member, said second end of said linkage member is attached to a resilient member that is attached to said lever arm.

2. The apparatus as recited in claim 1, wherein a distance from the slide rail to a rotation point of the lever arm is set proportionate to a total distance the lever arm travels past a point on the slide rail as the lever arm is rotated between the forward and rearward position.

3. The apparatus as recited in claim 1, wherein as the lever arm is rotated to a forward most position, a horizontal axis of a bottom of the lever arm is below a rotation axis of the rear wheel.

4. The apparatus as recited in claim 1, wherein said drive means further includes means for translating a rotational displacement of said lever arm to a rotational displacement of the rear wheel, said means for translating a rotational displacement of said lever arm tends to return the lever arm to its forward position when a rotational force is not being applied against said lever arm.

5. The apparatus as recited in claim 1, wherein a position that said first end of said linkage member is attached to said lower end of said lever arm is adjustable.

6. The apparatus as recited in claim 1, wherein a position that said lever arm is rotatably connected to said support member relative to a point on said slide rail is adjustable.

7. The apparatus as recited in claim 1, further including footrests attached to said frame proximate the front portion of said frame.

8. The apparatus as recited in claim 1, wherein said drive means further includes means for adjusting the amount of torque required to rotate the rear wheel.

9. The apparatus as recited in claim 1, further including a brake for reducing a rotation of the front wheel.

10. The apparatus as recited in claim 1, further including means for reducing the rotation of the rear wheel.

11. The apparatus as recited in claim 1, wherein a fulcrum of said lever arm is adjustable.

12. The apparatus as recited in claim 1, further including an adjustable travel stop attached to said lever arm.

13. The apparatus as recited in claim 6, wherein said steering means further includes a steering bar and steering cam assembly.

14. The apparatus as recited in claim 1, wherein the seat, in sliding communication with the slide rail, further comprises a plurality of offset rollers attached to the seat and aligned to slidingly engage with a corresponding track of the slide rail.

15. The apparatus as recited in claim 1, further including a stabilizing means attached to the rear wheel.

16. The apparatus as recited in claim 15, wherein said stabilizing means includes height adjusting members, each height adjustment member having means for setting the height adjustment member to a first height such that the rear wheel is elevated above a riding surface and a second height such that a lower portion of the height adjustment member is elevated above the riding surface.

17. The apparatus as recited in claim 16, further including a wheel rotatably attached to the lower portion of each height adjustment member.

18. An exercise apparatus propelled by a simulated rowing motion to exercise the upper and lower body muscles comprising:
   (a) a frame having front and rear wheels rotatably attached to the frame;
   (b) a slide rail forming a top portion of the frame and having a seat in sliding communication with said slide rail;
   (c) a support member attached to said slide rail and extending downward from said slide rail, wherein said slide rail and said support member lie in a central vertical plane of said apparatus;
   (d) a lever arm rotatably connected to said support member and rotatable between a forward and rearward position;
   (e) a steering assembly coupled to the front wheel for controlling the direction of travel of said apparatus; and
   (f) a drive assembly coupled to said lever arm and said rear wheel for translating a user's energy to propel the exercise apparatus, said drive assembly includes a linkage member having a first end attached to a lower end of said lever arm and extending upwardly and around a hub of the rear wheel to a second end of said linkage member, said second end of said linkage member is attached to a resilient member that is attached to said lever arm.

19. The apparatus as recited in claim 18, wherein a distance from the slide rail to a rotation point of the lever arm is set proportionate to a total distance the lever arm travels past a point on the slide rail as the lever arm is rotated between the forward and rearward position.

20. The apparatus as recited in claim 18, wherein as the lever arm is rotated to a forward most position, a horizontal axis of a bottom of the lever arm is below a rotation axis of the rear wheel.

21. The apparatus as recited in claim 18, wherein said drive assembly further includes means for translating a rotational displacement of said lever arm to a rotational displacement of the rear wheel, said means for translating a rotational displacement of said lever arm tends to return the lever arm to its forward position when a rotational force is not being applied against said lever arm.

22. The apparatus as recited in claim 18, wherein said resilient member is coupled to said lever arm at a point closer to a fulcrum of said lever arm than a point of attachment of the first end of the linkage member.

23. The apparatus as recited in claim 22, wherein a position that said first end of said linkage member is attached to said lower end of said lever arm is adjustable.

24. The apparatus as recited in claim 18, wherein a position that said lever arm is rotatably connected to said support member relative to a point on said slide rail is adjustable.

25. The apparatus as recited in claim 18, further including footrests attached to said frame proximate the front portion of said frame.

26. The apparatus as recited in claim 18, wherein said drive means further includes means for adjusting the amount of torque required to rotate the rear wheel.

27. The apparatus as recited in claim 18, wherein a fulcrum of said lever arm is adjustable.

28. The apparatus as recited in claim 18, further including a stabilizing means attached to the rear wheel.

29. The apparatus as recited in claim 28, wherein said stabilizing means includes height adjusting members, each height adjustment member having means for setting the height adjustment member to a first height such that the rear wheel is elevated above a riding surface and a second height such that a lower portion of the height adjustment member is elevated above the riding surface.

30. The apparatus as recited in claim 29, further including a wheel rotatably attached to the lower portion of each height adjustment member.

31. An exercise apparatus propelled by a simulated rowing motion to exercise the upper and lower body muscles comprising:
   (a) a frame having front and rear wheels rotatably attached to the frame;
   (b) a slide rail forming a top portion of the frame and having a seat in sliding communication with said slide rail;
   (c) a support member attached to said slide rail and extending downward from said slide rail, wherein said slide rail and said support member lie in a central vertical plane of said apparatus;
   (d) a lever arm rotatably connected to said support member and rotatable between a forward and rearward position;
   (e) a steering assembly coupled to the front wheel for controlling the direction of travel of said apparatus; and
   (f) a drive assembly coupled to said lever arm and said rear wheel, said drive assembly including a linkage member having a first end attached to a lower end of said lever arm and extending upwardly and around a hub of the rear wheel to a second end of said linkage member, said second end of said linkage member being attached to a resilient member that is attached to said lever arm.

32. The apparatus as recited in claim 31, wherein a distance from the slide rail to a rotation point of the lever arm is set proportionate to a total distance the lever arm travels past a point on the slide rail as the lever arm is rotated between the forward and rearward position.

33. The apparatus as recited in claim 31, wherein as the lever arm is rotated to a forward most position, a horizontal axis of a bottom of the lever arm is below a rotation axis of the rear wheel.

34. The apparatus as recited in claim 31, wherein a position that said first end of said linkage member is attached to said lower end of said lever arm is adjustable.

35. The apparatus as recited in claim 31, wherein a position that said lever arm is rotatably connected to said support member relative to a point on said slide rail is adjustable.

36. The apparatus as recited in claim 31, further including footrests attached to said frame proximate the front portion of said frame.

37. The apparatus as recited in claim 31, wherein said drive assembly further includes means for adjusting the amount of torque required to rotate the rear wheel.

38. The apparatus as recited in claim 31, wherein a fulcrum of said lever arm is adjustable.

39. The apparatus as recited in claim 31, further including a stabilizing means attached to the rear wheel.

40. The apparatus as recited in claim 39, wherein said stabilizing means includes height adjusting members, each height adjustment member having means for setting the height adjustment member to a first height such that the rear wheel is elevated above a riding surface and a second height such that a lower portion of the height adjustment member is elevated above the riding surface.

41. The apparatus as recited in claim 40, further including a wheel rotatably attached to the lower portion of each height adjustment member.

* * * * *